United States Patent
Mishima et al.

(10) Patent No.: US 8,515,195 B2
(45) Date of Patent: Aug. 20, 2013

(54) REMOTE EDITION SYSTEM, MAIN EDITION DEVICE, REMOTE EDITION DEVICE, EDITION METHOD, EDITION PROGRAM, AND STORAGE MEDIUM

(75) Inventors: Akira Mishima, Tokyo (JP); Eisaburo Itakura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1400 days.

(21) Appl. No.: 11/571,780

(22) PCT Filed: Jul. 15, 2005

(86) PCT No.: PCT/JP2005/013178
§ 371 (c)(1),
(2), (4) Date: Jan. 8, 2007

(87) PCT Pub. No.: WO2006/009120
PCT Pub. Date: Jan. 26, 2006

(65) Prior Publication Data
US 2008/0317431 A1 Dec. 25, 2008

(30) Foreign Application Priority Data
Jul. 16, 2004 (JP) ................................ 2004-210480

(51) Int. Cl.
*G06K 9/36* (2006.01)
*G06K 9/46* (2006.01)

(52) U.S. Cl.
USPC .......................................... 382/240; 382/232

(58) Field of Classification Search
USPC ................. 382/232, 233, 240; 709/203, 247
See application file for complete search history.

(56) References Cited

U.S. PATENT DOCUMENTS

| | | | | |
|---|---|---|---|---|
| 7,447,369 B2 * | 11/2008 | Gormish et al. | ............. | 382/235 |
| 2002/0051583 A1 * | 5/2002 | Brown et al. | ................. | 382/299 |
| 2003/0018818 A1 * | 1/2003 | Boliek et al. | ................. | 709/247 |
| 2003/0135649 A1 * | 7/2003 | Buckley et al. | ............. | 709/247 |
| 2004/0120591 A1 * | 6/2004 | Brower et al. | ............... | 382/240 |
| 2004/0218210 A1 * | 11/2004 | Shozaki et al. | ............ | 358/1.15 |

FOREIGN PATENT DOCUMENTS

| | | |
|---|---|---|
| JP | 5-324790 | 12/1993 |
| JP | 9-91463 | 4/1997 |
| JP | 10-285540 | 10/1998 |
| JP | 2001-268505 | 9/2001 |
| JP | 2003 152544 | 5/2003 |
| JP | 2004 194152 | 7/2004 |

\* cited by examiner

*Primary Examiner* — Li Liu
(74) *Attorney, Agent, or Firm* — Oblon, Spivak, McClelland, Maier & Neustadt, L.L.P.

(57) ABSTRACT

A remote editing system has a main editing apparatus configured to transmit, to a remote editing apparatus via a network, hierarchically encoded data that forms an image, the hierarchically encoded data belonging to a predetermined hierarchical level. The remote editing apparatus is configured to accept an editing operation using the hierarchically encoded data transmitted by the main editing apparatus to edit content of the hierarchically encoded data. The remote editing apparatus is further configured to request the main editing apparatus to transmit another hierarchically encoded data, and to generate edited image data using the another hierarchically encoded data transmitted by the main editing apparatus in compliance with the request.

18 Claims, 33 Drawing Sheets

DIVISION LEVEL = 3 (H: HIGH REGION; L: LOW REGION)

FIG.10

```
v=0 o=-28908844256 2890842807 IN IP4 43.XXXXX s=RTSP session u=rtsp://vodserver/contents/videoA.sdp u=0 1234 m=video 0 RTP/AVP 78 a=control:rtsp://vodserver/contents/videoA.mj2 a=order:RLCP5431    ~59
```

FIG. 14A

| SCENE NUMBER | IN | | OUT | |
|---|---|---|---|---|
| 1 | ☐ | 00:03:00:00 | ☐ | 00:03:14:29 |
| 2 | ☐ | 00:05:15:10 | ☐ | 00:05:20:09 |
| 3 | ☐ | 00:07:03:12 | ☐ | 00:07:08:11 |
| 4 | ☐ | 00:10:00:00 | ☐ | 00:10:14:29 |

● DUPLICATE  ○ MOVE  ○ DELETE

FIG. 14B

| SCENE NUMBER | IN | | OUT | |
|---|---|---|---|---|
| 1 | ☐ | 00:03:00:00 | ☐ | 00:03:14:29 |
| 2 | ☐ | 00:05:15:10 | ☐ | 00:05:20:09 |
| 3 | ☐ | 00:07:03:12 | ☐ | 00:07:08:11 |
| 4 | ☐ | 00:10:00:00 | ☐ | 00:10:14:29 |
| 5 | ☐ | 00:10:00:00 | ☐ | 00:10:14:29 |

● DUPLICATE  ○ MOVE  ○ DELETE

FIG. 15A

| SCENE NUMBER | IN | OUT |
|---|---|---|
| 1 | 00:03:00:00 | 00:03:14:29 |
| 2 | 00:05:15:10 | 00:05:20:09 |
| 3 | 00:07:03:12 | 00:07:08:11 |
| 4 | 00:10:00:00 | 00:10:14:29 |
| 5 | 00:13:00:00 | 00:15:14:29 |

○ DUPLICATE  ● MOVE  ○ DELETE

FIG. 15B

| SCENE NUMBER | IN | OUT |
|---|---|---|
| 1 | 00:03:00:00 | 00:03:14:29 |
| 2 | 00:05:15:10 | 00:05:20:09 |
| 3 | 00:10:00:00 | 00:10:14:29 |
| 4 | 00:13:00:00 | 00:15:14:29 |
| 5 | 00:07:03:12 | 00:07:08:11 |

○ DUPLICATE  ● MOVE  ○ DELETE

FIG. 16A

| SCENE NUMBER | IN | OUT |
|---|---|---|
| 1 | 00:03:00:00 | 00:03:14:29 |
| 2 | 00:05:15:10 | 00:05:20:09 |
| 3 | 00:07:03:12 | 00:07:08:11 |
| 4 | 00:10:00:00 | 00:10:14:29 |
| 5 | 00:13:00:00 | 00:15:14:29 |

○ DUPLICATE  ○ MOVE  ● DELETE
86          88       89

| SCENE NUMBER | IN | OUT |
|---|---|---|
| 1 | 00:03:00:00 | 00:03:14:29 |
| 2 | 00:05:15:10 | 00:05:20:09 |
| 3 | 00:10:00:00 | 00:10:14:29 |
| 4 | 00:13:00:00 | 00:15:14:29 |

○ DUPLICATE  ○ MOVE  ● DELETE 75, 90

FIG.17

| SCENE NUMBER | IN POINT | OUT POINT |
|---|---|---|
| 1 | 03:00:00:00 | 00:03:14:29 |
| 2 | 00:05:15:10 | 00:05:20:09 |
| 3 | 00:07:03:12 | 00:07:08:11 |
| 4 | 00:10:00:00 | 00:10:14:29 |

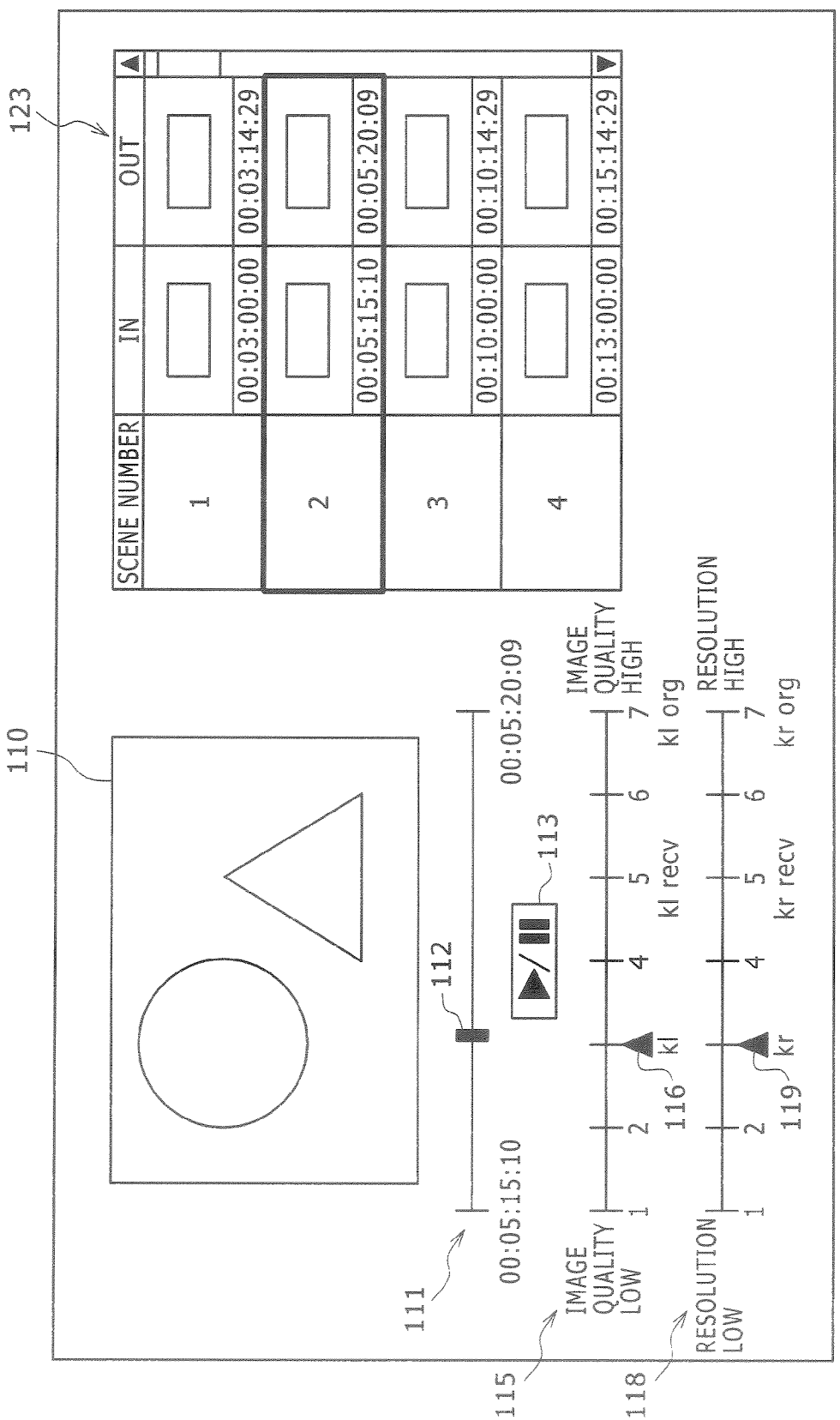

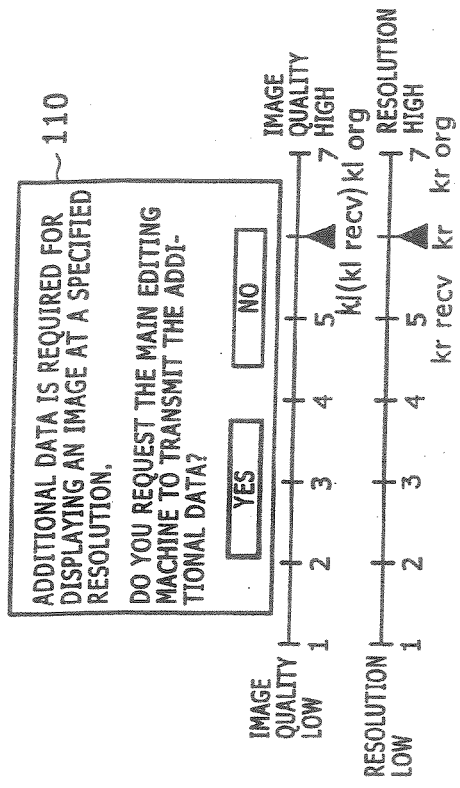
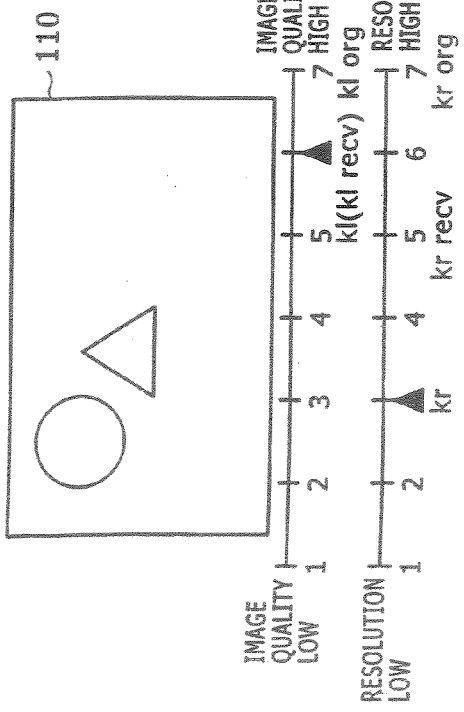
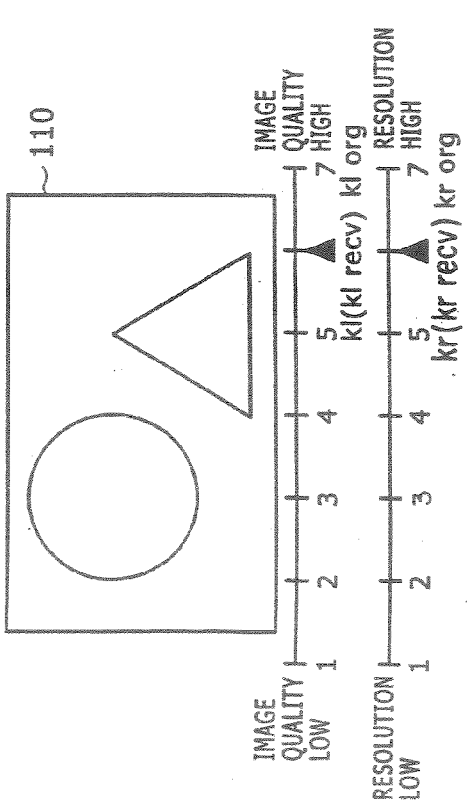

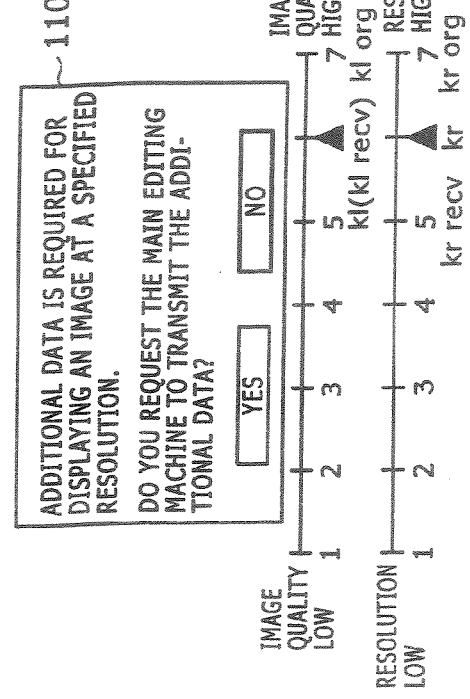
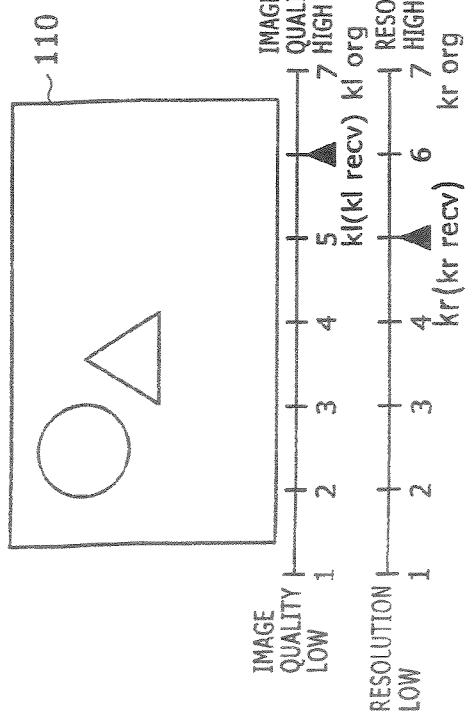
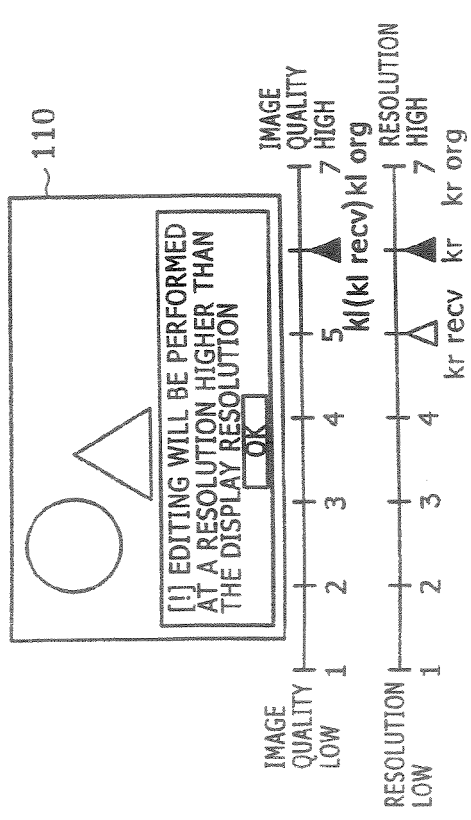

FIG.28

| SCENE NUMBER (141) | IN POINT (142) | OUT POINT (143) | IMAGE QUALITY LEVEL (144) | RESO-LUTION LEVEL (145) | ROI IMAGE QUALITY (146) | ROI TILE NUMBER (147) |
|---|---|---|---|---|---|---|
| 1 | 00:03:00:00 | 00:03:14:29 | 3 | 4 | | |
| 2 | 00:05:15:10 | 00:05:20:09 | 3 | 4 | | |
| 3 | 00:07:03:12 | 00:07:08:11 | 3 | 4 | 5 | 5 |
| 4 | 00:10:00:00 | 00:10:14:29 | 5 | 4 | | |
| 5 | 00:13:00:00 | 00:15:14:29 | 5 | 4 | | |
| 6 | 00:15:00:00 | 00:15:06:05 | 5 | 4 | | |

FIG.29

| SCENE NUMBER | TILE NUMBER | IMAGE QUALITY LEVEL (LAYER COUNT) |
|---|---|---|
| 2 | 1 | 3 |
| 2 | 2 | 3 |
| 2 | 3 | 3 |
| 2 | 4 | 3 |
| 2 | 5 | 5 |
| 2 | 6 | 3 |
| 2 | 7 | 3 |
| 2 | 8 | 3 |
| 2 | 9 | 3 |

REMOTE EDITION SYSTEM, MAIN EDITION DEVICE, REMOTE EDITION DEVICE, EDITION METHOD, EDITION PROGRAM, AND STORAGE MEDIUM

TECHNICAL FIELD

The present invention relates to a remote editing system, main editing apparatus, remote editing apparatus, editing method, editing program, and storage medium, and more particularly to a technology for performing an image data editing process with high efficiency by enabling a main editing machine to hierarchically encode image data, which serves as a material and supply the encoded image data to a remote editing machine.

BACKGROUND ART

[Conventional Technology for Remote Editing]

Image data, particularly motion picture data, is widely used. For example, it is broadcast by television, distributed through a network, or stored on a DVD (Digital Versatile Disc) or other storage medium for sale.

The above image data is generated by editing image data that is generated, for instance, by video recording.

Image data editing is either locally performed at an editing station having raw image data (image data that serves as a material) or remotely performed after transmitting raw image data through a network.

For local editing an editing process is performed by connecting a VTR, which stores raw image data, to an editing apparatus which edits the raw image data, with a short cable that does not cause transmission delay.

As a technology for performing the above editing process a "data transmission system" is disclosed by Japanese Patent Laid-Open No. Hei 10-75413.

When the above technology is used, the editing apparatus transmits a time code request command to the VTR, and the VTR returns a time code to the editing apparatus to ensure that an accurate editing process is performed in accordance with the time code.

Further, scenes (time ranges) are arbitrarily selected from one or more pieces of image data through the use of the time code. The image data contained in the selected scenes are then interconnected to create a piece of edited image data.

A point that serves as a scene connection point is called an edit point. The edit point is usually specified by a time code that indicates the time position of the edit point within the entire image data.

On the other hand, when editing is to be remotely performed, the raw image data is usually compressed before being transmitted to the remote editing machine because the communication capacity of a network is generally smaller than the size of raw image data.

Therefore, even when video recording is performed in a high-definition (high image quality) mode, the remote editing machine performs editing after transcoding the image resolution to a standard-definition (standard image quality) level.

FIG. 36 shows a typical system configuration for the scheme described above. A main editing machine 501 retains raw image data.

A terminal 502 performs an encoding operation to reduce the bit rate by converting the resolution (spatial resolution) of raw image data or by lowering the image quality, maps the raw image data to network packets, and transmits the packets to a network 503.

The image data transmitted to the network 503 is received and decoded by another terminal 504, and then input into a remote editing machine 505.

An editor uses the image data to perform editing with the remote editing machine 505 and generates editing information (editing list).

The editing information is transmitted from the remote editing machine 505 to the main editing machine 501. The main editing machine 501 generates edited image data from the raw image data in accordance with the editing information.

The remote editing system described above is also described in Japanese Patent Laid-Open No. Hei 10-75413.

[Conventional Technology for Image Hierarchzation]

Image data, particularly motion picture data, is large in size. Therefore, it is usually compressed by a certain method before being saved or transmitted.

An MPEG (Moving Pictures Experts Group) compression technology is commonly used as an image compression method.

In recent years, technological development activities have been vigorously conducted to provide means for storing an MPEG stream, which is generated by means of MPEG compression, in IP packets conforming to the IP (Internet Protocol) and distribution the IP packets through the Internet.

The MPEG stream transmitted to the Internet is received and reproduced by PCs (Personal Computers), PDAs (Personal Digital Assistants), cellular phones, and various other communication terminals.

For video-on-demand or live image streaming distribution or video conferencing, video telephoning, or other real-time communication, it is necessary to assume that image data is transmitted/received between communication terminals having different capacities.

More specifically, the data transmitted from an information transmission source may be received and reproduced by a cellular phone or other communication terminal having a low-resolution display and a low-speed CPU (Central Processing Unit) or by a desktop PC, a set-top box, a game machine, or other communication terminal having a high-resolution monitor and a high-speed CPU.

A communication system based on hierarchical encoding or a method of hierarchical encoding of image data to be transmitted/received is conceived as a scheme for efficiently performing an image data transmission/reception process and image display process in accordance, for instance, with the processing capacity of each communication terminal in a situation where data is transmitted to various communication terminals having different processing capacities as mentioned above.

The hierarchically encoded image data is packetized in the aspect which can distinguish the encoded data to be processed only at a communication terminal having a high-resolution display from the encoded data to be processed commonly by a communication terminal having a high-resolution display and a communication terminal having a low-resolution display, and the packetized data is transmitted by the transmitting end.

At the receiving end, the encoded data matching its capacity is selected and processed.

An example of a compression/decompression method that permits hierarchical encoding would be a video stream that is provided by MPEG 4 or JPEG (Joint Photographic Experts Group) 2000.

MPEG 4 incorporates a fine granularity scalability technology and has become profiled. With this hierarchical encoding technology, it is possible to provide distribution in a scalable manner and at low to high bit rates.

On the other hand, JPEG 2000, which is based on a wavelet transform, can achieve hierarchical packetization on the basis of resolution or on the basis of image quality by making effective use of a wavelet transform.

Further, JPEG 2000 provides the Motion JPEG 2000 Part 3, which can handle motion pictures as well as still pictures and save hierarchical data in a file format.

In a conventional data distribution system, the transmitting end has to generate data in different formats depending on the capacity of a data reception terminal and prepare different data in accordance with the transmission rate. However, when the hierarchical encoding process described above is performed, the use of single file data makes it possible to simultaneously distribute data to terminals having different capacities.

When, for instance, image data is to be distributed, the UDP (User Datagram Protocol) is often used for communication through the Internet because real-time capabilities are required. Further, the RTP (Real-time Transport Protocol) is used for a UDP layer to use a defined format for each application, that is, each encoding method.

A technology for handling hierarchical data as described above is described in Japanese Patent Laid-Open No. 2003-152544 (hereafter referred to as Patent Document 2), which discloses a "data communication system."

The above technology relates to the retransmission of packets containing hierarchically encoded image data. This technology is described below in detail.

For example, a DCT (Discrete Cosine Transform) based technology is used for the distribution of hierarchically encoded data.

This technology provides hierarchization with high and low regions differentiated from each other by performing a DCT process on image data and other data to be distributed, generates packets that are classified into high and low regions, and achieves data distribution.

The UDP differs from the TCP (Transmission Control Protocol)/IP in that the former does not retransmit packets even when packet loss occurs. Therefore, when the UDP is used, packet loss may occur due, for instance, to network congestion.

Patent Document 2 mentioned above proposes a scalable distribution technology based on a wavelet transform technology, which can exercise retransmission control over packet loss.

DISCLOSURE OF INVENTION

In a conventional remote editing system, a hierarchical encoding process was not used for image data compression.

Consequently, although the remote editing machine capacity and the circuit speed available within a network greatly varied, the image data compression ratio was low so that a large number of bands were required for transmission.

For broadcast image data editing, it is demanded that available bands be fully used in various situations to perform editing while maintaining high image quality.

Therefore, it is necessary to perform an image data resolution conversion process and DCT region transcoding process for the purpose of reducing the amount of information in accordance, for instance, with the remote editing machine capacity while maintaining high quality. Thus, it is necessary to use a multiprocessor, dedicated transcoding hardware, or the like with a view toward increasing the speeds of the above processes.

Under the above circumstances, it is an object of the present invention to perform a hierarchical encoding process for image data compression and perform meticulous remote editing with high efficiency while making the most of the hierarchical encoding process.

To accomplish the above object, the present invention provides a remote editing system in which a remote editing apparatus edits hierarchically encoded data, which forms an image stored in a main editing apparatus, via a network, wherein the main editing apparatus transmits to the remote editing apparatus the hierarchically encoded data that belongs to a predetermined hierarchical level; and wherein the remote editing apparatus accepts an editing operation that uses the transmitted hierarchically encoded data, requests the main editing apparatus to transmit hierarchically encoded data that is necessary for the generation of edited image data due to editing, and generates edited image data by using the hierarchically encoded data that is transmitted from the main editing apparatus in compliance with the request (first configuration).

The present invention also provides a main editing apparatus that includes data storage means for storing hierarchically encoded data, which forms an image; data transmission means for transmitting to a remote editing apparatus the stored hierarchically encoded data belonging to a predetermined hierarchical level; request data reception means for receiving from the remote editing apparatus a transmission request for hierarchically encoded data necessary for edited image data generation in the remote editing apparatus; and request data transmission means for transmitting the requested hierarchically encoded data to the remote editing apparatus (second configuration).

In a request that is received by the request data reception means within the second configuration, the hierarchical levels of one or more hierarchical elements defining the picture quality of an image are specified. The request data transmission means may be configured to transmit the stored hierarchically encoded data that corresponds to the specified hierarchical levels of the hierarchical elements (third configuration).

In the second configuration the data transmission means may be configured to transmit the stored hierarchically encoded data that belongs to a hierarchical level corresponding to the remote editing apparatus (fourth configuration).

In the second configuration the remote editing apparatus may include hierarchical level configuration transmission means that transmits the hierarchical level configuration of the stored hierarchically encoded data and the hierarchical level configuration of the transmitted hierarchically encoded data (fifth configuration).

The present invention also provides a remote editing apparatus that includes data reception means for receiving hierarchically encoded data, which forms an image, from a main editing apparatus; reproducing means for reproducing an image by using the received hierarchically encoded data; editing means for accepting an editing operation by using the reproduced image; data request means for requesting the main editing apparatus to transmit hierarchically encoded data necessary for the generation of edited image data due to editing by the editing means; and edited image data generation means for receiving hierarchically encoded data that is transmitted from the main editing apparatus in compliance with the request, and generating edited image data by using the received hierarchically encoded data (sixth configuration).

In the sixth configuration, the editing means may be configured to accept hierarchical levels specified for a plurality of hierarchical elements that define the picture quality of an edited image, and the data request means may be configured to transmit the hierarchical levels of the specified hierarchical elements to the main editing apparatus (seventh configuration).

The sixth configuration may further include hierarchical level selection means for accepting hierarchical level selections for the hierarchical elements. The reproducing means may be configured to reproduce an image by using the hierarchically encoded data corresponding to the hierarchical level selections (eighth configuration).

The sixth configuration may further include hierarchical level presentation means for receiving the hierarchical level configuration of hierarchically encoded data stored in the main editing apparatus and the hierarchical level configuration of the received hierarchically encoded data from the main editing apparatus and presenting the received hierarchical level configurations (ninth configuration).

The seventh configuration may further include warning display means for indicating a situation where the hierarchical level of a hierarchical element defining the picture quality of an image reproduced by the reproducing means differs from the hierarchical level of a hierarchical element defining the picture quality of the specified edited image (tenth configuration).

The present invention also provides an editing method for use in a computer that includes data storage means, data transmission means, request data reception means, and request data transmission means, the editing method including: a data storage step of causing the data storage means to store hierarchically encoded data that forms an image; a data transmission step of causing the data transmission means to transmit to a remote editing apparatus the stored hierarchically encoded data corresponding to a predetermined hierarchical level; a request data reception step of causing the request data reception means to receive from the remote editing apparatus a transmission request for hierarchically encoded data necessary for edited image data generation in the remote editing apparatus; and a request data transmission step of causing the request data transmission means to transmit the requested hierarchically encoded data to the remote editing apparatus (eleventh configuration).

In the eleventh configuration, the request received in the request data reception step may specify the hierarchical levels of one or more hierarchical elements defining the picture quality of an image, and the request data transmission step may be configured to transmit the stored hierarchically encoded data corresponding to the hierarchical levels of the specified hierarchical elements (twelfth configuration).

In the eleventh configuration, the data transmission step may be configured to transmit the stored hierarchically encoded data belonging to a hierarchical level that corresponds to the remote editing apparatus (thirteenth configuration).

In the eleventh configuration, the computer may further include hierarchical level configuration transmission means, and the editing method may further include a hierarchical level configuration transmission step of transmitting to the remote editing apparatus the hierarchical level configuration of the stored hierarchically encoded data and the hierarchical level configuration of the transmitted hierarchically encoded data (fourteenth configuration).

The present invention also provides an editing method for use in a computer that includes data reception means, reproducing means, editing means, data request means, and edited image data generation means, the editing method including: a data reception step of causing the data reception means to receive hierarchically encoded data for image formation from a main editing apparatus; a reproducing step of causing the reproducing means to reproduce an image by using the received hierarchically encoded data; an editing step of causing the editing means to accept an editing operation by using the reproduced image; a data request step of causing the data request means to request the main editing apparatus to transmit hierarchically encoded data necessary for the generation of edited image data due to editing by the editing means; and an edited image data generation step of causing the edited image data generation means to receive hierarchically encoded data that is transmitted from the main editing apparatus in compliance with the request, and generate edited image data by using the received hierarchically encoded data (fifteenth configuration).

In the fifteenth configuration, the editing step may be configured to accept hierarchical levels specified for a plurality of hierarchical elements defining the picture quality of an edited image, and the data request step may be configured to transmit the hierarchical levels specified for the hierarchical elements to the main editing apparatus (sixteenth configuration).

In the fifteenth configuration the computer may further include hierarchical level selection means, the editing method may further include a hierarchical level selection step of causing the hierarchical level selection means to receive hierarchical level selections for the hierarchical elements, and she reproducing step may be configured to reproduce an image by using the hierarchically encoded data corresponding to the selected hierarchical level (seventeenth configuration).

In the fifteenth configuration, the computer may further include hierarchical level presentation means, and the editing method may further include a hierarchical level presentation step of causing the hierarchical level presentation means to receive the hierarchical level configuration of hierarchically encoded data stored in the main editing apparatus and the hierarchical level configuration of the received hierarchically encoded data from the main editing apparatus and present the received hierarchical level configurations (eighteenth configuration).

In the sixteenth configuration, the computer may further include warning display means and the editing method may further include a warning display step of causing the warning display means to indicate a situation where the hierarchical level of a hierarchical element defining the picture quality of an image reproduced in the reproducing step differs from the hierarchical level of a hierarchical element defining the picture quality of the specified edited image (nineteenth configuration).

The present invention also provides an editing program that causes a computer to implement a data storage function for storing hierarchically encoded data that forms an image; a data transmission function for transmitting to a remote editing apparatus the stored hierarchically encoded data that belongs to a predetermined hierarchical level; a request data reception function for receiving a transmission request for hierarchically encoded data necessary for edited image data generation in the remote editing apparatus; and a request data transmission function for transmitting the requested hierarchically encoded data to the remote editing apparatus (twentieth configuration).

In a request that is received by the request data reception function within the twentieth configuration, the hierarchical levels of one or more hierarchical elements defining the picture quality of an image are specified. The request data transmission function may be configured to transmit the stored hierarchically encoded data that corresponds to the specified hierarchical levels of the hierarchical elements (twenty-first configuration).

In the twentieth configuration the data transmission function may be configured to transmit the stored hierarchically encoded data belonging to a hierarchical level that corresponds to the remote editing apparatus (twenty-second configuration).

In the twentieth configuration the editing program may be configured to cause the computer to implement a hierarchical level configuration transmission function for transmitting the hierarchical level configuration of the stored hierarchically encoded data and the hierarchical level configuration of the transmitted hierarchically encoded data to the remote editing apparatus (twenty-third configuration).

The present invention also provides an editing program that causes a computer to implement a data reception function for receiving hierarchically encoded data for image formation from a main editing apparatus; a reproducing function for reproducing an image by using the received hierarchically encoded data; an editing function for accepting an editing operation by using the reproduced image; a data request function for requesting the main editing apparatus to transmit hierarchically encoded data necessary for the generation of edited image data due to editing by the editing function; and an edited image data generation function for receiving hierarchically encoded data that is transmitted from the main editing apparatus in compliance with the request, and generating edited image data by using the received hierarchically encoded data (twenty-fourth configuration).

In the twenty-fourth configuration, the editing function may be configured to accept hierarchical levels specified for a plurality of hierarchical elements defining the picture quality an edited image, and the data request function may be configured to transmit the specified hierarchical levels of the hierarchical elements to the main editing apparatus (twenty-fifth configuration).

In the twenty-fourth configuration, the editing program may be configured to cause the computer to implement a hierarchical level selection function for receiving hierarchical level selections for the hierarchical elements, and the reproducing function may be configured to reproduce an image by using the hierarchically encoded data corresponding to the selected hierarchical levels (twenty-sixth configuration).

In the twenty-fourth configuration, the editing program may be configured to cause the computer to implement a hierarchical level presentation function for receiving the hierarchical level configuration of hierarchically encoded data stored in the main editing apparatus and the hierarchical level configuration of the received hierarchically encoded data from the main editing apparatus and presenting the received hierarchical level configurations (twenty-seventh configuration).

In the twenty-fifth configuration, the editing program may be configured to cause the computer to implement a warning display function for indicating a situation where the hierarchical level of a hierarchical element defining the picture quality of an image reproduced by the reproducing function differs from the hierarchical level of a hierarchical element defining the picture quality of the specified edited image (twenty-eighth configuration).

The present invention also provides a computer-readable storage medium that stores the editing program according to any one of the twentieth to twenty-eighth configurations.

BRIEF DESCRIPTION OF DRAWINGS

FIG. 10 shows an example in which a progressive order and content hierarchical level are written in an extended section of an SDP.

FIGS. 14A and 14B show examples of duplication mode modification screens.

FIGS. 15A and 15B show examples of move mode modification screens.

FIGS. 16A and 16B show examples of deletion mode modification screens.

FIG. 17 shows an example of a logical configuration of a time code list.

FIG. 22 shows an example of an picture quality editing screen

FIGS. 24A to 24 illustrate a case where the picture quality editing screen is used to change the resolution level FIGS. 25A to 25C illustrate a procedure for specifying whether or not to request additional hierarchically encoded data.

FIG. 28 shows an example of a logical configuration of editing information.

FIG. 29 illustrates a case where the image quality level is to be defined for each tile.

Figure 1:
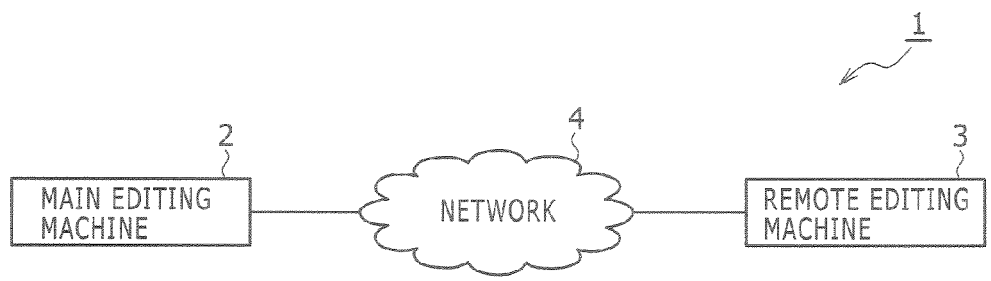
FIG. 1 shows a typical configuration of a remote editing system.

BEST MODE FOR CARRYING OUT THE INVENTION (Embodiment Overview)

A main editing machine transmits hierarchically encoded image data corresponding to a network use band and the capacity of a remote editing machine to the remote editing machine. An editor uses the remote editing machine to perform editing. In accordance with editing information that is created as a result of editing, the remote editing machine generates edited image data. If hierarchically encoded data at a high hierarchical level is required for the generation of edited image data, the remote editing machine obtains the necessary hierarchically encoded data from the main editing machine, and generates edited image data by using the newly obtained hierarchically encoded data and previously obtained hierarchically encoded data.

Image data can be meticulously hierarchized with reference to elements defining picture quality such as resolution and image quality.

Hierarchically encoded data, which is obtained by hierarchically encoding image data, is such that the image quality can be improved by adding high-level hierarchically encoded data to low-level hierarchically encoded data.

The main editing machine transmits hierarchically encoded data at a hierarchical level corresponding to the remote editing machine, which is among raw image data and does not require a transcoding or other similar process.

The remote editing machine decodes the received hierarchically encoded data to obtain image data, and can reproduce the image data after changing the resolution and image quality in a scalable manner at the received hierarchical level. The editor can determine a desired hierarchical level while viewing the reproduced image.

If the image is to be reproduced with the image quality enhanced, the editor should request the main editing machine to transmit hierarchically encoded data that represents the difference.

First of all, the remote editing machine specifies a scene for use with edited image data while reproducing an image by using the hierarchically encoded data received by the editor. Next, the editor specifies the hierarchical levels of various hierarchical elements such as resolution and image quality. In this instance, it is possible to specify a resolution or image quality that does not belong to a hierarchical level that is not received from the main editing machine.

As a result of editing, the remote editing machine creates a time code that identifies a scene, and editing information that specifies the hierarchical level of each scene.

The remote editing machine then generates edited image data by organizing the scene identified by the editing information at the specified image quality level. However, if the edited image data can be generated with the hierarchically encoded data that is already received by the remote editing machine, the remote editing machine uses the received hierarchically encoded data to generate the edited image data. If any additional hierarchically encoded data is required, the remote editing machine requests the main editing machine to transmit such additional hierarchically encoded data. When the main editing machine transmits the additional hierarchically encoded data in compliance with the request, the remote editing machine generates the edited image data (final image data in the case of an end product) by using both the additional hierarchically encoded data and the previously received hierarchically encoded data.

As described above, the present embodiment simply has to transmit to the remote editing machine the hierarchically encoded data corresponding to the remote editing machine without performing a transcoding or like process. Further, the remote editing machine can specify the hierarchical level for organizing the edited image data without receiving the entire raw image data.

(Detailed Embodiment Description)

[System Overview and Data Transmission/Reception Configuration Example]

The present embodiment uses a wavelet transform method for hierarchical encoding purposes. Although there are various wavelet transform type hierarchical encoding methods, the present embodiment assumes that a JPEG2000 video stream which is a motion picture compression format, is used for hierarchical encoding of motion picture data.

The JPEG2000 video stream organizes motion picture display frames as successive intra-frames that do not correlate with each other. Therefore, the JPEG2000 video stream is advantageous in that even when packet loss occurs within a network, a packet-loss-based error does not propagate to the other frames. Further, it is also advantageous in that visual image quality (SNR or signal-to-noise ratio) deterioration can be avoided because no block noise or mosquito noise occurs due to the characteristics of a wavelet transform.

More specifically, the JPEG2000 video stream divides the image data of each frame into components (c such as color space and brightness and divides an after-mentioned region into nonoverlapping tiles.

Further, the JPEG2000 video stream divides the image data which is divided as described above, into resolution levels (r) by subjecting it to wavelet division based on a wavelet transform described later, and subdivides the resolution levels in accordance with the degree of image quality (1) contribution. For each tile, the elements defining the picture quality, such as the components, resolution, and image quality, are hierarchized into various levels, and they constitute hierarchical elements.

It should also be noted that the hierarchically encoded data (hierarchically encoded image data) is further divided into small regions called precincts. Details will be given later.

As regards a certain frame image, the data obtained from one image quality level (layer) of one resolution level of one tile of one component is called a packet that is a unit of hierarchically encoded data.

FIG. 1 shows a typical configuration of a remote editing system that uses the hierarchical encoding technology described above.

The remote editing system 1 includes a main editing machine 2, a remote editing machine 3, and a network 4. The main editing machine 2 uses editing information to generate edited image data from raw image data. The remote editing machine 3 is used by an editor to perform edits and generate editing information. The network 4 interconnects the main editing machine 2 and remote editing machine 3.

Although FIG. 1 shows only one unit of the remote editing machine 3, a plurality of remote editing machines, such as stationary, mobile, or other remote editing machines differing in capacity, may exist in the system.

FIG. 1 assumes that an IP (Internet Protocol) network is used.

The main editing machine 2 retains raw image data (original image data that may be edited). The raw image data is subjected to a hierarchical encoding process and formulated as hierarchically encoded data.

The main editing machine 2 receives the information about acceptable speed that permits connection to the network, the information about decodability of hierarchically encoded data received within an acceptable speed range, and the QoS (Quality of Service) information such as the resolution displayable by a reception terminal and the bit rate appropriate for CPU capacity, and then judges the available band and capacity of the network 4 of the remote editing machine 3.

In accordance with the above judgment, the main editing machine 2 notes the raw image data to determine the hierarchical levels of the hierarchically encoded data to be transmitted, packetizes necessary hierarchically encoded data, and transmits the resulting packets to the remote editing machine 3.

When a request for the transmission of hierarchically encoded data necessary, for instance, for an editing process or for final image data generation is received from the remote editing machine 3 after the transmission of hierarchically encoded data, the main editing machine 2 transmits the requested data to the remote editing machine 3.

The network 4 is a transmission path for delivering packets to a transmission destination in accordance with address information that is set in an IP packet.

Various data transmission styles are used. For example, the packets are transmitted to the remote editing machine 3 through a service provider network that offers a dial-up service or through a service provider network that uses an ADSL (Asymmetric Digital Subscriber Line). In some other situation, a wireless network is used so that the packets are transmitted through a base station (not shown) to the remote editing machine 3 that includes a mobile terminal or the like.

The remote editing machine 3 receives hierarchically encoded data, decodes it, and reproduces it. Further, the remote editing machine 3 accepts an editing process that is performed by the editor, and generates editing information. In addition, the remote editing machine 3 generates edited image data in accordance with the editing information.

The present embodiment assumes that the hierarchically encoded data is transmitted by a unicast method that transmits text appropriate for a terminal. The remote editing machine 3 receives all packets addressed to it from the main editing machine 2.

If a multicast method is employed or the transmission of hierarchically encoded data, packets belonging to hierarchical levels that are not required for the remote editing machine 3 are also transmitted Therefore, the remote editing machine 3 selectively receives packets at hierarchical levels not higher than the required hierarchical level.

The remote editing machine 3 decodes the hierarchically encoded data and reproduces an image. The editor specifies a scene, determines the resolution and image quality hierarchical level, and performs other editing operations while viewing the reproduced image.

As described above, the remote editing machine 3 can perform editing operations with thumbnail images, which are reproduced from some hierarchically encoded data, even when it does not receive the entire hierarchically encoded data that constitutes the raw image data.

The picture quality of the image reproduced by the remote editing machine 3 depends on the hierarchical level transmitted from the main editing machine 2. However, the editor can request the main editing machine 2 to provide a higher hierarchical level with the picture quality of the raw image data set as an upper limit.

The term "picture quality" refers to elements defining the picture quality, such as resolution, image quality, brightness, and color difference.

The remote editing machine 3 receives additional hierarchically encoded data that the main editing machine 2 transmits in compliance with the request, and adds the received additional hierarchically encoded data to the previously received hierarchically encoded data, thereby making it possible to reproduce an image whose picture quality is enhanced.

When editing information is created through an editing operation, the remote editing machine 3 generates edited image data in accordance with the editing information.

If edited image data having picture quality defined by the editing information can be generated from the previously received hierarchically encoded data, the previously received hierarchically encoded data is used to generate the edited image data. If, on the other hand, hierarchically encoded data at a hierarchical level higher than that of the previously received hierarchically encoded data is required, It is acquired from the main editing machine 2 to generate the edited image data.

[Main Editing Machine Configuration and Process]

The configuration and process of the main editing machine 2 will now be described.

Figure 2:
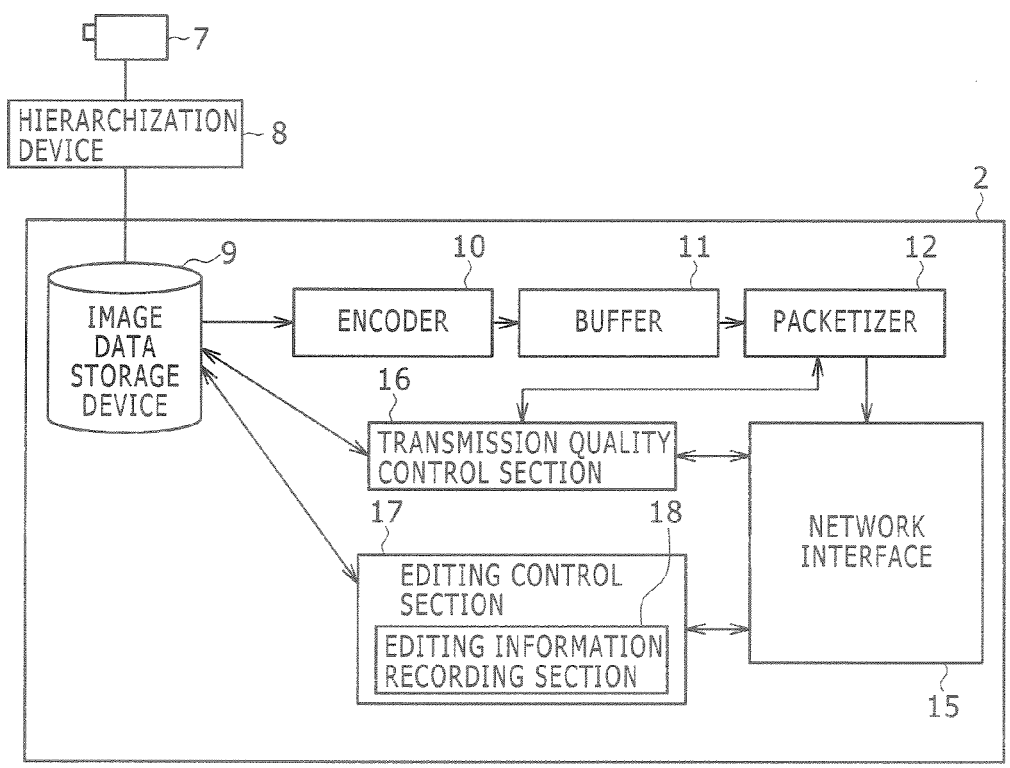
FIG. 2 is a block diagram illustrating a configuration of a main editing machine.

FIG. 2 is a block diagram illustrating the main editing machine 2 FIG. 2 indicates that a hierarchization device 8 is external to the main editing machine 2. However, the hierarchization device 8 may be formed inside the main editing machine 2.

In the example shown in FIG. 2, image data acquired by a video camera 7 is hierarchically encoded by the hierarchization device 8 and stored in an image data storage device 9. Alternatively, however, image data stored on a DVD, CD (Compact Disc), hard disk or other storage medium may be hierarchically encoded and stored in the image data storage device 9.

Image data acquired through the network 4 may also be hierarchically encoded and stored in the image data storage device 9.

The hierarchization device 8 hierarchically encodes unencoded image data by a wavelet transform method. In this instance, the hierarchization device 8 performs a progressive encoding process in a predetermined progressive order.

The progressive encoding process is an encoding process that is frequently used, for instance, for image distribution through the Internet. It makes it possible to first display a low-quality image at a data reception terminal and then progressively raises the quality of the displayed image.

For example, the progressive order is indicated in accordance with the permutation and combination of four element numbers (c, r, l, p). Typical progressive orders are RLCP progressive order and LRCP progressive order. The RLCP progressive order progressively increases the resolution, whereas the LRCP progressive order progressively improves the image quality.

The RLCP progressive order provides hierarchically encoded data arrangement that begins with hierarchically encoded data of low-frequency image data corresponding to a low-resolution image, which is followed by hierarchically encoded data of high-frequency components required for a high-definition image. When decoding is performed in packet sequence, the resolution gradually increases.

The remote editing machine 3 can cause a display to show a rough outline image within a short period of time by first performing decoding and display processes on the hierarchically encoded data of low-frequency image data. Subsequently, the remote editing machine 3 can gradually display a high-definition image by decoding and displaying the hierarchically encoded data in a high-frequency region.

Similarly, when the LRCP progressive order is used, hierarchically encoded data are arranged in order from low-image-quality data packets to high-image-quality data packets. Therefore, when decoding is performed in packet sequence, the image quality gradually increases.

In addition, the progressive order based on color components (RGB or YCbCr) may be used. When this progressive order is employed encoding is performed for each color component (RGB or YCbCr).

Image data that has not been subjected to hierarchical encoding is hierarchically encoded in accordance with a certain progressive order and stored in the image data storage device 9.

A wavelet transform will now be described.

In a wavelet transform, a frame image is divided into non-overlapping rectangular areas, called tiles. A conversion process is performed on each tile.

Figure 3:
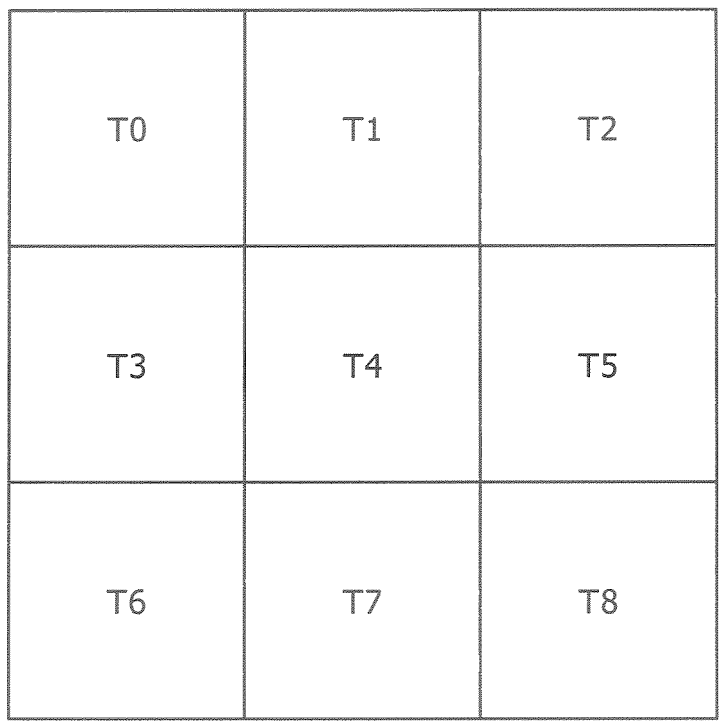
FIG. 3 shows an image that is divided into tiles.

FIG. 3 shows an image that is divided into nine tiles (tiles T0 to T8). The tiles are encoded independently of each other and used as a basic unit for an encoding process.

Figure 4:
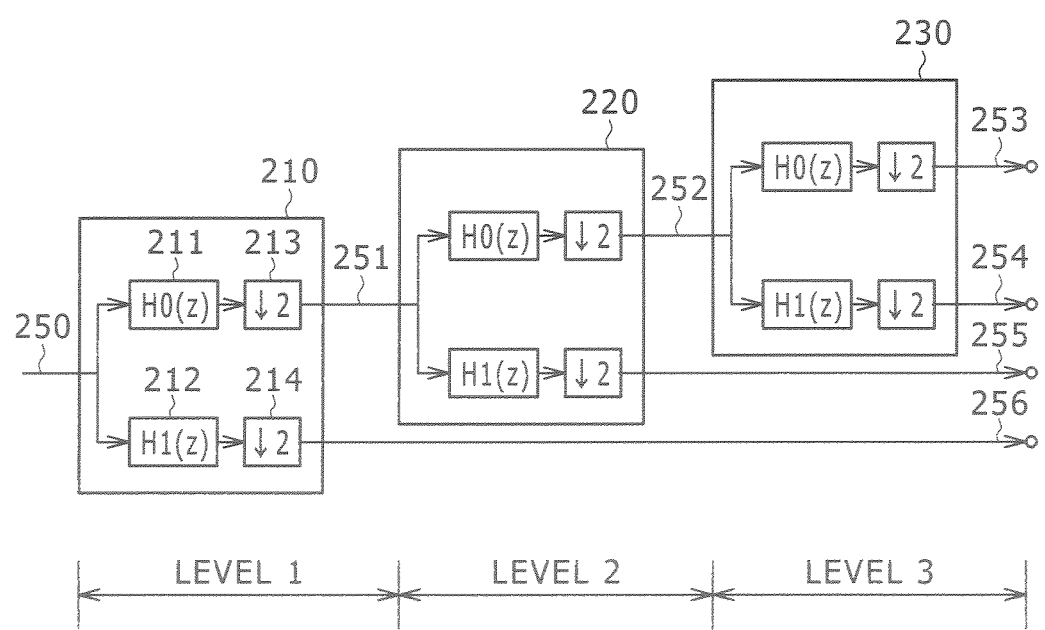
FIG. 4 shows a configuration of a hierarchization device.

FIG. 4 shows a typical configuration of the hierarchization device 8, which performs a wavelet transform process. This figure shows an example in which an octave division process is performed at a plurality of levels. The octave division process is the commonest wavelet transform process.

In the example shown in FIG. 4, there are three hierarchical levels (levels 1 to 3). The image signal is divided into a low region and high region The configuration shown in this figure provides hierarchical division of low-region components only. For the sake of simplicity FIG. 4 shows a wavelet transform process that is performed on a one-dimensional signal (e.g., the horizontal component of an image). However, when extension is provided to perform a two-dimensional wavelet transform process, two-dimensional image signals can be handled.

The operation performed by the hierarchization device 8 will now be described. An input image signal 250, which is delivered to a wavelet transform section shown in FIG. 4, is band-split by a low-pass filter 211 (transmission function H0 (z)) and by a high-pass filter 212 (transmission function H1 (z)). The resolutions of the resulting low-region component and high-region component are reduced to half by respective down samplers 213, 214 (hierarchical level 1).

In the above instance, two outputs are generated: L component 231 and H component 256. The letter "L" represents a low region (Low) whereas the letter "H" represents a high region (High).

The low-pass filter 211, the high-pass filter 212, and the two down samplers 213, 214 constitute a circuit section 210 for hierarchical level 1.

The low-region component of the signal whose resolution is reduced by the down samplers 213, 214, that is, only the signal fed from down sampler 213, is band-split by the low-pass filter and high-pass filter in a circuit section 220 for hierarchical level 2, and the resolutions of the resulting components are reduced to half by the respective down samplers (hierarchical level 2).

The circuit section 220 that includes the low-pass filter, high-pass filter, and down samplers for hierarchical level 2 is configured the same as the circuit section 210 that includes the low-pass filter 211 high-pass filter 212, and down samplers 213, 214 for hierarchical level 1.

When the process described above is performed for predetermined hierarchical levels, band components whose low-region components are hierarchically band-split are sequentially generated.

Band components generated at hierarchical level 2 are an LL component 252 and an LH component 255. In the example shown in FIG. 4, band-splitting is performed for hierarchical levels 1 to 3, and the output from the low-pass filter side down sampler in the circuit section 220 for hierarchical level 2 is supplied to the circuit section 230 for hierarchical level 3, which is configured the same as the aforementioned circuit section 210.

As a result of band-splitting at hierarchical levels 1 to 3, an LLL component 253, an LLH component 254, an LH component 255, and an H component 256 are generated.

Figure 5:
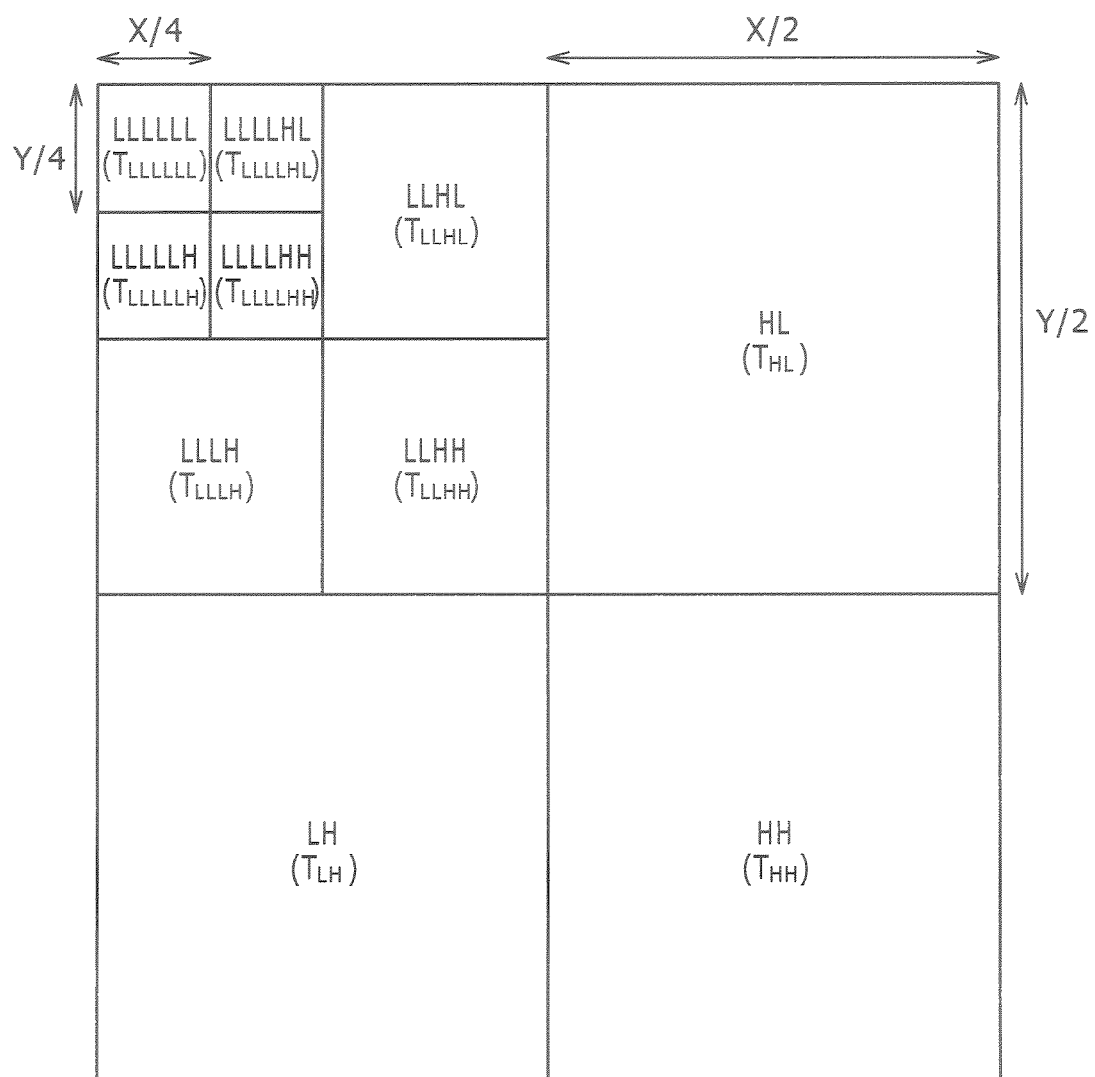
FIG. 5 shows band components that are obtained when a two-dimensional image is band-split.

FIG. 5 shows band components that are obtained when a two-dimensional image is band-split at hierarchical levels 1 to 3.

The notation for the letters "L" and "H" in FIG. 5 differs from the notation for the counterparts in FIG. 4, which illustrates the handling of a one-dimensional signal.

More specifically, in FIG. 5, band-splitting (horizontal and vertical directions) at hierarchical level 1 gives rise to four components: LL, LH, HL, and HH. The symbol "LL" indicates that both the horizontal and vertical components are L. The symbol "LH" indicates that the horizontal component is H whereas the vertical component is L.

Next, the LL component is band-split again so that LLLL, LLHL, LLLH, and LLHH are generated Further, the LLLL component is band-spilt again so that LLLLLL, LLLLHL, LLLLLH, and LLLLHH are generated.

Figure 6:
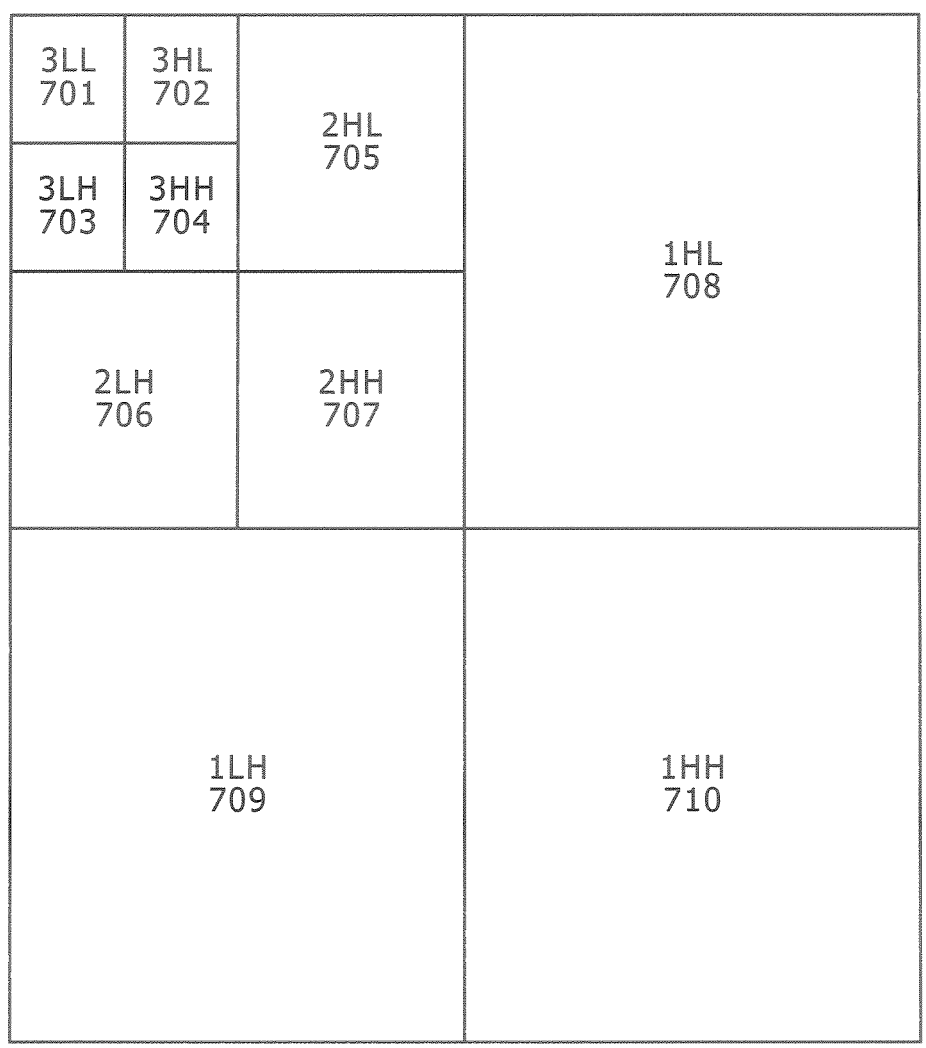
FIG. 6 illustrates hierarchical level classifications based on resolution.

Hierarchical level classification according to the resolution of wavelet transform data will be further described with reference to FIG. 6. The configuration shown in FIG. 6 corresponds to the data configuration shown in FIG. 5. As described with reference to FIG. 5, FIG. 6 illustrates a case where a division process is performed three times for a wavelet transform.

The most important hierarchical level provides data that is necessary for causing the display to show a rough outline image. It corresponds to encoding regions containing low-region (3LL) data, that is, data regions 701 to 704, which are reduced to ⅛ in size.

The second most important hierarchical level provides the next low-region data regions, which are reduced to ¼ in size. It includes data regions 701 to 707. The third important hierarchical level provides the next low-region data regions, which are reduced to ½ in size. It includes data regions 701 to 710.

The image data storage device 9 stores image data that is hierarchically encoded by the hierarchization device 8. The image data storage device 9 stores data that is hierarchically encoded in a predefined progressive order, that is, either in a resolution-progressive order or in an image-quality-progressive order.

An encoder 10 will now be described. The encoder 10 generates a code stream from the hierarchically encoded data stored in the image data storage device 9, and outputs the generated code stream to a buffer 11.

Figure 7:
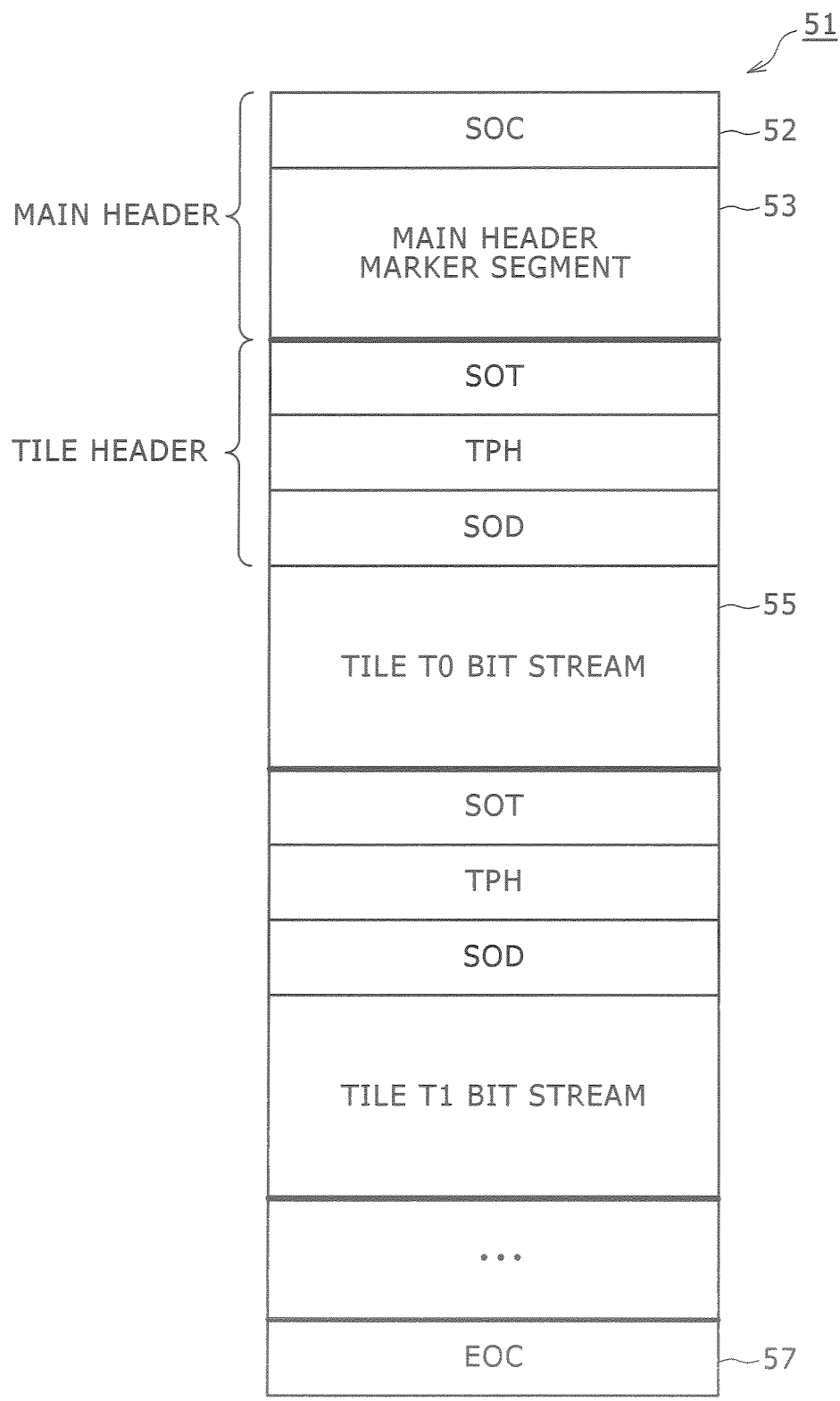
FIG. 7 shows a data structure of a code stream.

FIG. 7 shows a data structure of the code stream that is output from the encoder 10.

The code stream 51 begins with an SOC (Start of Code stream) marker 52, which indicates the beginning of the code stream. The SOC marker 52 is followed by a main header marker segment 53 in which, for instance, encoding parameters, quantization parameters, and progressive order are written. The SOC marker 52 and main header marker segment 53 constitute a main header (MH). The information contained in the main header is essential to the decoding of the entire code stream.

The main header is followed by a tile header (TH) which contains tile information and bit streams, which are the data about tiles. For example, bit stream 55 is a bit stream for tile T0.

This bit stream has the aforementioned hierarchical structure (l, r, c, p). Further, the progressive order of the tiles may be written in the tile header.

Finally, an EOC (End of Codestream) marker 57 is attached to indicate the end of the code stream.

Returning to FIG. 2, the buffer 11 temporarily stores the code stream for packetization purposes.

A packetizer 12 analyzes the hierarchically encoded data in the buffer 11, determines breakpoints in accordance with the contents of data, and performs packetization.

The packetizer 12 references the main header for the data stored in the buffer 11 to acquire the Information about the progressive order for hierarchically encoded data, the number of layers, and color components.

The packetizer 12 reads the above field information to analyze the employed hierarchical structure. The packetizer 12 hierarchically sorts the hierarchically encoded data in accordance with the analyzed information, and performs a packet generation process in accordance with the sorted data. In such an instance, the packetizer 12 achieves code stream packetization in compliance with a request from a transmission quality control section 16, which is described later.

Two examples of hierarchical configurations based on a progressive order defined by JPEG2000 and packet configurations corresponding to the hierarchical configurations will now be described.

Figure 8:
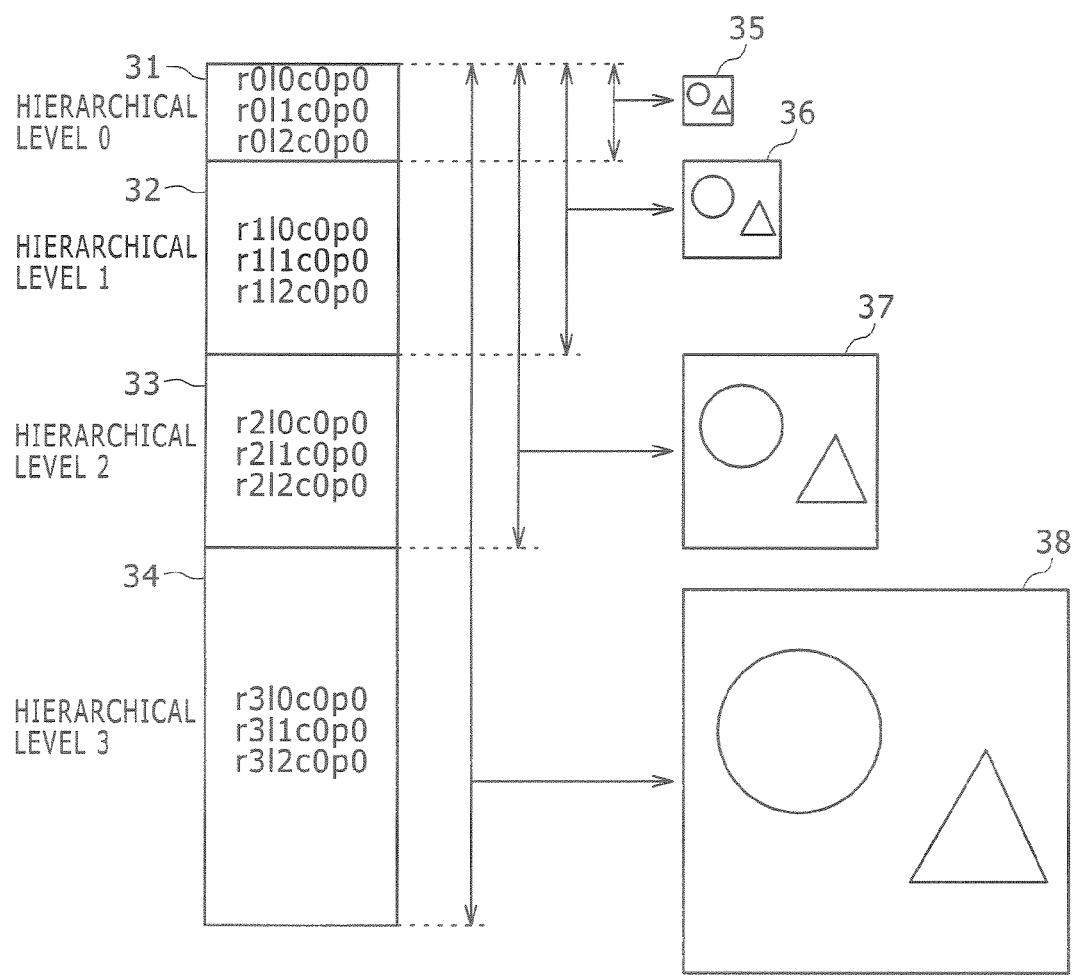
FIG. 8 illustrates hierarchically encoded data that is arranged in a resolution-progressive order.

FIG. 8 is a conceptual diagram illustrating an example in which hierarchically encoded data arranged in a resolution-progressive order is hierarchically associated with packets.

A one-frame image is composed of packet 31 (hierarchical level (or layer) 0), packet 32 (hierarchical level 1), packet 33 (hierarchical level 2), and packet 34 (hierarchical level 3).

When the hierarchically encoded data stored in packet 31 is decoded, an image 35 whose resolution is reduced to ⅛ is obtained.

Packet 31 stores hierarchically encoded data having the highest priority, which is required for initially displaying a rough image on a display at a data reception terminal that performs a decoding process.

Next, when the hierarchically encoded data stored in packets 31 and 32 are decoded an image 36 whose resolution is reduced to ¼ is obtained. Further, when the hierarchically encoded data stored in packets 31 to 33 are decoded, an image 37 whose resolution is reduced to ½ is obtained. When the hierarchically encoded data stored in packets 31 to 34 are decoded an image 38 having the original resolution is obtained.

In order from the highest priority to the lowest priority, the four packets shown in FIG. 8 are packet 31, packet 32, packet 33, and packet 34.

As indicated in FIG. 8, when hierarchically encoded data is generated by performing a progressive encoding process for which different resolutions are set in a progressive order, the packetizer 12, which functions as packet generation means, performs a process for setting hierarchical priority information corresponding to various resolutions of hierarchically encoded data for the image signals stored in generated packets as additional information about the generated packets.

Figure 9:
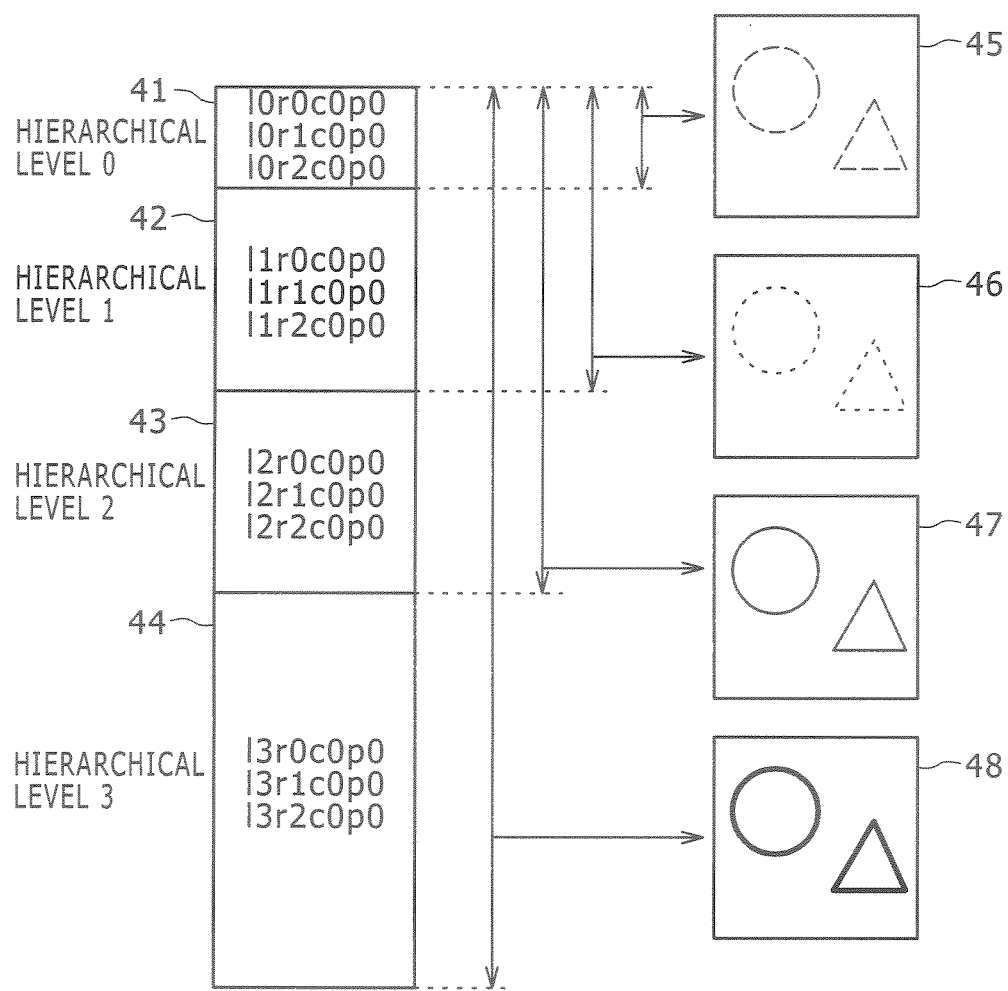
FIG. 9 illustrates hierarchically encoded data that is arranged in an image-quality-progressive order.

FIG. 9 is a conceptual diagram illustrating an example in which hierarchically encoded data arranged in an image-quality-progressive or SNR-progressive order is hierarchically associated with packets.

A one-frame image is composed of packet 41 (hierarchical level (or layer) 0), packet 42 (hierarchical level), packet 43 (hierarchical level 2) and packet 44 (hierarchical level 3). When the hierarchically encoded data stored in packet 41 is decoded, an image 45 having the same resolution as the original low-quality image is obtained. When the hierarchically encoded data stored in packets 41 and 42 are decoded, an image 46 having higher image quality than the decoding result of the hierarchically encoded data stored in packet 41 is obtained. Next, when the hierarchically encoded data stored in packets 41 to 43 are decoded, a high-quality image 47 having reduced noise is obtained. When the hierarchically encoded data stored in packets 41 to 44 are decoded, the highest-quality image is obtained.

In order from the highest priority to the lowest priority, the four packets shown in FIG. 9 are packet 41, packet 42, packet 43, and packet 44.

As indicated in FIG. 9, when hierarchically encoded data is generated by performing a progressive encoding process for which different image qualities are set in a progressive order, the packetizer 12, which functions as packet generation means, sets hierarchical priority information corresponding to various image qualities of hierarchically encoded data for the image signals stored in generated packets as additional information about the generated packets.

The progressive encoding process for resolution and image quality has been described above. However it is also possible to formulate hierarchically encoded data that is arranged in a color-component-progressive order.

For example, when the hierarchically encoded data stored in a Y packet is decoded, a black-and-white image is obtained. When the hierarchically encoded data stored in Y and U packets is decoded a color image containing a U component is obtained. Further, when the hierarchically encoded data stored in Y, U, and V packets is decoded, a color image containing a V component is obtained.

In the above instance, in order from the highest priority to the lowest priority, the packets are the Y packet, U packet, and V packet.

The transmission quality control section 16 supplies the information (QoS) about transmission quality (this transmission quality may be referred to as q') to the packetizer 12 in compliance with a request from the remote editing machine 3 or network conditions.

For example, the information about transmission quality q includes an image data progressive order and the information for specifying the hierarchical level of each necessary hierarchical element. The packetizer 12 packetizes a code stream in such a manner as to achieve the above-mentioned transmission quality.

Further, the transmission quality control section 16 acquires an additional request for hierarchically encoded data through a network interface 15 and forwards the acquired request to the packetizer 12. In this instance, the packetizer 12 packetizes the additionally requested hierarchically encoded data.

Therefore, when the remote editing machine 3 makes a request for additional transmission of hierarchically encoded data at hierarchical level 3 after the transmission of hierarchically encoded data at hierarchical levels 0 to 2, the hierarchically encoded data at hierarchical level 3 can be packetized by the packetizer 12 and transmitted.

The network interface 15 transmits the hierarchically encoded data packetized by the packetizer 12 to the network 4, and receives an additional request for hierarchically encoded data from the remote editing machine 3 or editing information from the remote editing machine 3.

An editing control section 17 acquires editing information from the remote editing machine 3 via the network interface 15 and records the acquired editing information in an editing information recording section 18.

Further, the editing control section 17 references the editing information recording section 18 and detects the difference between the hierarchically encoded data specified by the editing information and the hierarchically encoded data already transmitted to the remote editing machine 3 (stored, for instance, in the transmission quality control section 16).

The hierarchically encoded data corresponding to the difference is encoded by the encoder 10, forwarded to the packetizer 12 via the buffer 11, packetized by the packetizer 12, and transmitted from the network interface 15 to the remote editing machine 3.

The present embodiment is configured so that the difference in the hierarchically encoded data is transmitted to the remote editing machine 3. However, the present invention may be applied to cases where various other transmission styles are employed.

For example, an alternative embodiment may be employed so as to extract the hierarchically encoded data specified by the editing information from the hierarchically encoded data stored in the image data storage device 9 and transmit the extracted data to the remote editing machine 3. In this instance, the remote editing machine 3 receives again the already received hierarchically encoded data.

If, for instance, the progressive order is changed in the above instance, it is possible to perform a process, for instance, for changing the packet sequence and changing the data in the main header and tile part header.

Further, an alternative configuration may be employed so that the remote editing machine 3 detects the difference in the hierarchically encoded data and transmits difference information for identifying the difference in the hierarchically encoded data to the main editing machine 2 instead of the editing data.

In the above instance, the main editing machine 2 simply has to read the hierarchically encoded data specified by the difference information from the image data storage device 9 and transmit the read data to the remote editing machine 3. In this case, the editing control section 17 and editing information recording section 18 are not required.

However, if the main editing machine 2 needs to confirm what edited image data is generated by the remote editing machine 3, the configuration should be modified so that the remote editing machine 3 transmits the editing information to the main editing machine 2.

The main editing machine 2 may incorporate a function for editing the editing information (editing information reediting means), which is not shown.

In this instance, the main editing machine 2 has the same editing function as the remote editing machine 3, and modifies edits performed by the remote editing machine 3 while reproducing the raw image data or reproducing an image in accordance with the editing information.

When the main editing machine 2 is configured as described above so that the main editing machine 2 can reproduce the raw image data and edited image data to display them and respecify the scene or picture quality, better editing results can be obtained.

Meanwhile, the highest quality resolution, image quality, etc.) that can be achieved with the edited image data is equal to the quality (resolution, image quality etc.) possessed by the raw image data.

Therefore, when performing an editing operation with the remote editing machine 3, it is necessary to transmit the hierarchical level information about the raw image data, which serves as the upper-limit values for specified element values, to the remote editing machine 3 to notify the remote editing machine 3 of an editable hierarchical level range.

The remote editing machine 3 controls a hierarchical level designation operation in such a manner that the specified edited image data value does not exceed the hierarchical level of the raw image data. This makes it possible to independently exercise hierarchical level control over a plurality of hierarchical elements (image formation elements), which define the picture quality, by, for instance, keeping high image quality and reducing the resolution or keeping high image quality and using a brightness component only within an editable hierarchical level range.

Various methods are available for notifying the remote editing machine 3 of an editable hierarchical level range. For example, the SDP (Session Description Protocol) can be used.

The SDP is a protocol that is generally used to transmit/receive multimedia data. It has a freely-definable extended portion in order to provide extensibility. The present embodiment defines a new attribute in the extended portion of the SDP, writes the progressive order of raw image data, the highest hierarchical level of hierarchical elements, and other Information about the picture quality of raw image data, and causes the main editing machine 2 to transfer the written information to the remote editing machine 3 as a part of an initialization operation when the transfer of the image data targeted for editing begins.

FIG. 10 shows an example of the SDP. Line 59 describes a progressive order for the raw image data and the highest hierarchical level of each hierarchical element.

"RLCP" in line 59 indicates that the hierarchical element progressive order is resolution-image quality-component-position. The subsequent numbers (5, 4, 3, 1) respectively indicate the resolution-indicating wavelet division count (resolution hierarchical level count) layer count (image quality hierarchical level count) component count (component hierarchical level count) and tile count.

In other words, the raw image data has gone through five wavelet transforms, allowed the conversion coefficient to be bit-planed into four layers and is compressed by three components (YUV).

In the main editing machine 2 described above, the image data storage device 9 functions as data storage means that stores hierarchically encoded data for image formation.

The use of the encoder 10, buffer 11, packetizer 12, and transmission quality control section 16 makes it possible to transmit predetermined hierarchically encoded data appropriate for the remote editing machine 3. The main editing machine 2 includes data transmission means that transmits hierarchically encoded data belonging to a predetermined hierarchical level to the remote editing machine 3.

Further, the main editing machine 2 includes request data reception means and request data transmission means. The request data reception means receives from the remote editing machine 3 a transmission request for hierarchically encoded data that is necessary for editing and edited image data generation processes. The request data transmission means transmits requested hierarchically encoded data to the remote editing machine 3.

The request received by the request data reception means specifies the hierarchical level of each hierarchical element of hierarchically encoded data. The request data transmission means transmits to the remote editing machine 3 the hierarchically encoded data stored in the image data storage device 9 that corresponds to the specified hierarchical levels.

Further, the remote editing machine 3, which receives hierarchically encoded data, can determine the hierarchical level configuration of the received hierarchically encoded data The main editing machine 2 uses the SDP to report the hierarchical level configuration of the raw image data (hierarchical level configuration transmission means).

[Remote Editing Machine Configuration and Editing Process]

The configuration and editing process of the remote editing machine 3 will now be described.

The remote editing machine 3 performs an editing process with the hierarchically encoded data transmitted from the main editing machine 2, and generates editing information and edited image data.

FIG. 1 is a block diagram illustrating the remote editing machine 3

A network interface 61 receives packets that are transmitted from the main editing machine 2.

A depacketizer 62 acquires the packets from the network interface 61 and obtains hierarchically encoded data in the packets.

A decoder 63 stores the hierarchically encoded data, which is obtained by the depacketizer 62, in a temporary storage device 66, reads the hierarchically encoded data at an editor-specified hierarchical level from the temporary storage device 66, decodes the read data, and causes a display device 67 to display the decoded data.

As a result the editor can view an image while varying the picture quality.

An alternative configuration may be used so that the hierarchically encoded data obtained by the depacketizer 62 is decoded by the decoder 63 and directly displayed by the display device 67.

Another alternative configuration may also be used so that the decoder 63 stores the decoded image data in the temporary storage device 66 and causes the display device 67 to reproduce the stored image data.

The editor can then perform edits in real time. The hierarchically encoded data for an editor-specified scene can be stored in the temporary storage device 66.

Figure 12:
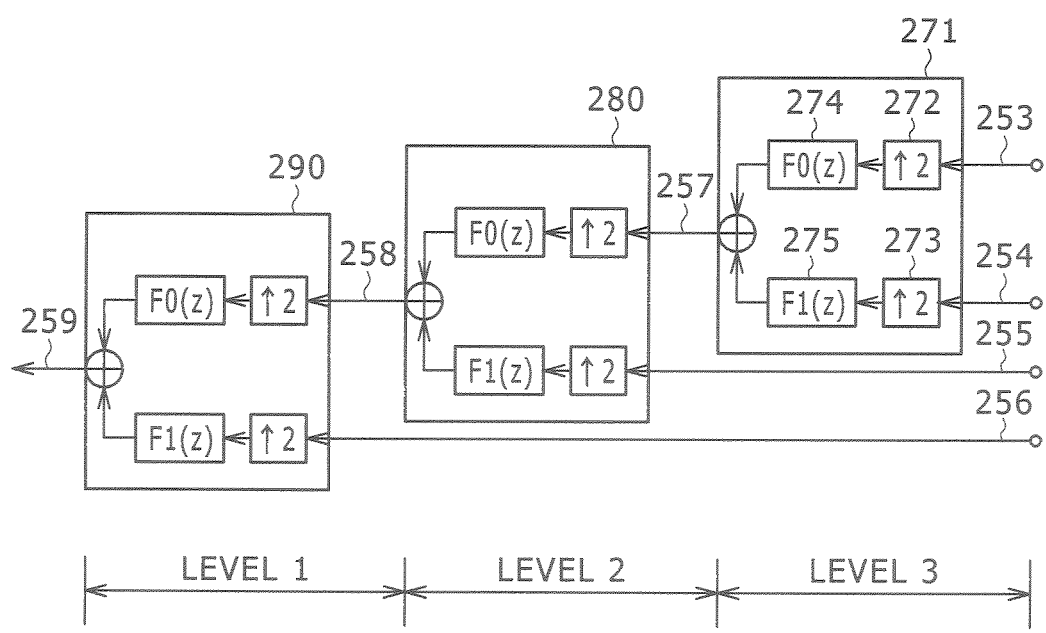
FIG. 12 is a block diagram illustrating a decoder.

FIG. 12 is a block diagram illustrating the decoder 63.

The decoder 63 has an inverse wavelet transform processing configuration, which reverses the wavelet transform process described earlier with reference to FIG. 4.

In other words, when the band components 253, 254, 255, 256, which are the outputs from the wavelet transform section described with reference to FIG. 4, are input into an inverse wavelet transform section shown in FIG. 12, the LLL component 253 and LLH component 254 are first upsampled to twofold resolution by upsamplers 272, 273.

Next, the low-region component is filtered by a low-pass filter 274, whereas the high-region component is filtered by a high-pass filter 275. The resulting two band components are then synthesized by an adder.

In a circuit section 271 described so far, an inverse transform, which is the reverse of a transform performed in the circuit section 230 for hierarchical level 3 in FIG. 4 (designated "level 3" in the figure) is completed so that the LL component 257, which is the low-region band component for hierarchical level 2, is obtained.

When the above process is repeatedly performed for hierarchical levels down to 1, a final, inverse-transformed, decoded image 259 is output.

In other words, the circuit section 280 for hierarchical level 2 and the circuit section 290 for hierarchical level 1 have the same configuration as the circuit section 271 for hierarchical level 3. The output from the circuit section 271 for hierarchical level 3 is forwarded as the low-region input to the circuit section 280 for hierarchical level 2, and the output from the circuit section 280 for hierarchical level 2 is forwarded as the low-region input to the circuit section 290 for hierarchical level 1. The basic configuration of a common inverse wavelet transform section has been described above.

Figure 11:
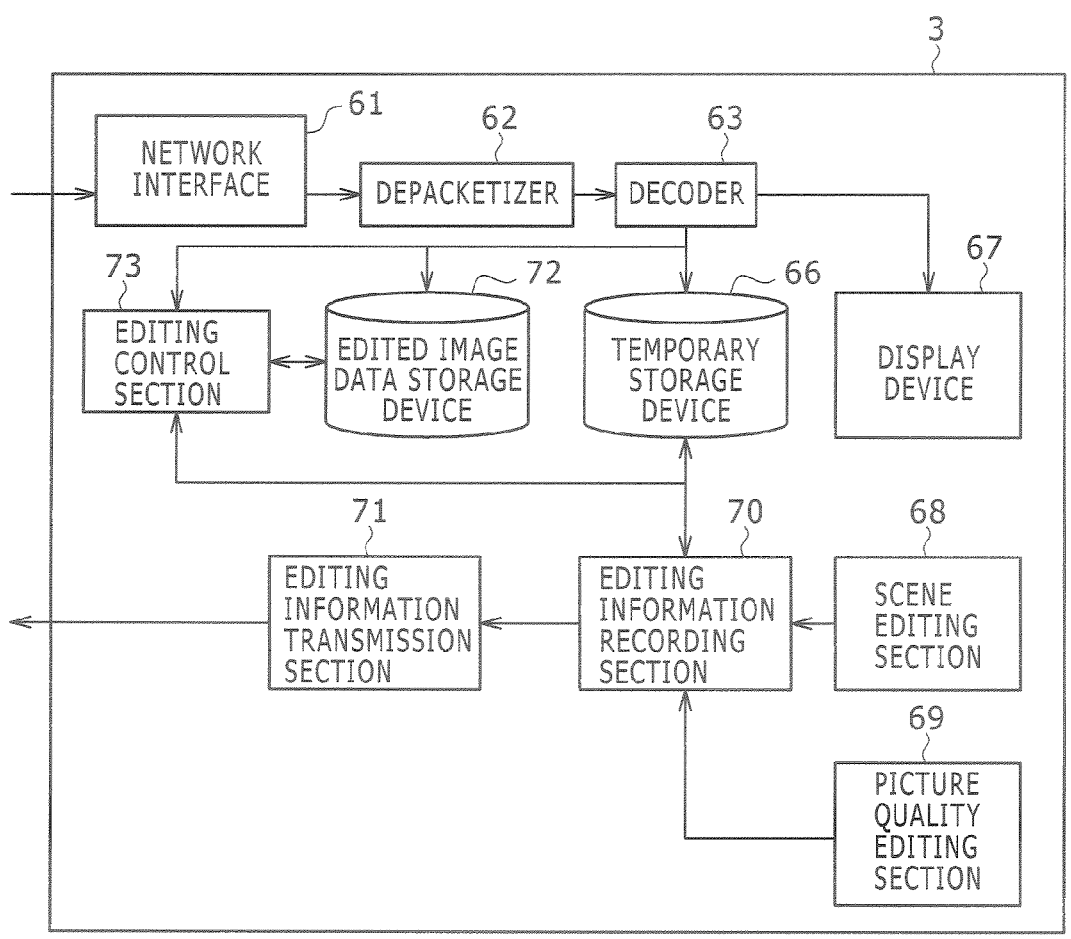
FIG. 11 is a block diagram illustrating a remote editing machine.

Returning to FIG. 11 the display device 67 reproduces the image that was obtained when the decoder 63 acquired the hierarchically encoded data from the temporary storage device 66 and decoded it, and displays the image on a display or other similar device.

The editor can perform edits while confirming the image data reproduced by the display device 67.

A scene editing section 68 is an interface that the editor uses to generate scenes while viewing the image reproduced by the display device 67. Scene generation is conducted by specifying a set of edit points.

A set of edit points includes an in point and an out point. The in point is a scene start position, whereas the out point is a scene end point. The time range within image data that is delimited by the in point and out point, that is, a scene, is a picture quality editing range. These edit points are recorded in an editing information recording section 70.

An alternative configuration may be employed so that the scene editing section 68 includes a temporary storage device, stores edit points, and collectively transfers the stored edit points to the editing information recording section 70.

A picture quality editing section 69 is an interface that the editor uses to control the picture quality (resolution, image quality, etc.) of each scene. The picture quality editing section 69 records a specified picture quality in the editing information recording section 70 as the editing information. Further, the picture quality editing section 69 can specify the progressive order.

The picture quality editing section 69 may be included in the scene editing section 68.

The picture quality editing section 69 may also be configured so as to directly pass picture quality definition information to an editing information transmission section 71.

The editing information recording section 70 records editing information with the edit points specified by the scene editing section 68 associated with the time code while referencing the hierarchically encoded data stored in the temporary storage device 66.

Further the editing information recording section 70 associates each recorded scene with the picture quality specified by the picture quality editing section 69 and incorporates the resulting information into the editing information.

Two or more units of the editing information recording section 70 may be used, for instance, for time code recording and picture quality recording purposes.

Further the editing Information recording section 70 may be configured to generate the editing information by using a duplicate of the hierarchically encoded data stored in the temporary storage device 66 instead of the hierarchically encoded data stored in the temporary storage device 66.

In addition, the editing information recording section 70 may incorporate a function for driving a removable storage medium and record the editing information on a removable storage medium.

In the above instance, a storage medium on which the editing information is stored may be delivered to the main editing machine 2 by using a motorbike, train motorcar, airplane, or other means of transportation.

The editing information transmission section 71 transmits the editing information recorded in the editing information recording section 70 to the main editing machine 2 via the network 4 by, for instance, converting it into network packets.

The editing information transmission section 71 may be formulated by network interface 61 or other network interface that is not shown.

If there is difference-indicating hierarchically encoded data after editing information transmission to the main editing machine 2, the main editing machine 2 transmits such hierarchically encoded data. The transmitted hierarchically encoded data is then stored in the temporary storage device 66.

As a result, the temporary storage device 66 stores the hierarchically encoded data necessary for the generation of edited image data.

In accordance with the editing information, an editing control section 73 extracts the hierarchically encoded data from the temporary storage device 66 and generates edited image data.

For the generation of edited image data, the stored hierarchically encoded data is read from the temporary storage device 66 for each specified scene until the hierarchical level providing the specified resolution and image quality is reached, and the data read in this manner is transferred to an edited image data storage device 72. In this instance, the progressive order can be changed in accordance with the editing information.

The edited image data storage device 72 stores the edited image data that is generated during an editing process. If the remote editing machine 3 is equipped with a storage device that uses a magnetic recording disk or other large-capacity storage medium, such a storage device may double as the temporary storage device 6 and edited image data storage device 72. In such an instance, the edited image data storage device 72 is not needed, and the edited image data is formulated in the temporary storage device 66.

An alternative configuration may be employed so that the editing control section 73 removes unnecessary image data from the temporary storage device 66 in such a manner as to retain images that comply with the editing information and specified picture quality conditions.

Two or more units of the editing information recording section 70 and edited image data storage device 72 may exist. In addition, a duplication section for duplicating the editing information recorded in the editing information recording section 70 and the edited image data stored in the edited image data storage device 72 and an output section for outputting the information and data to the outside may be furnished to supply the information and data to a third party.

An editing operation that is performed with the remote editing machine 3, which is configured as described above, will now be described. The editing operation includes generating a scene and specifying the picture quality of a designated scene.

First of all, a method of specifying a scene will be described. Scene generation includes specifying edit points and duplicating, moving, or deleting designated scenes. When these operations are performed, a time code list for edit points is generated.

It is assumed that the time code is included in an option for the frame data header or in an option for the file format, associated with relevant image data, and transmitted from the main editing machine to the remote editing machine.

Figure 13:
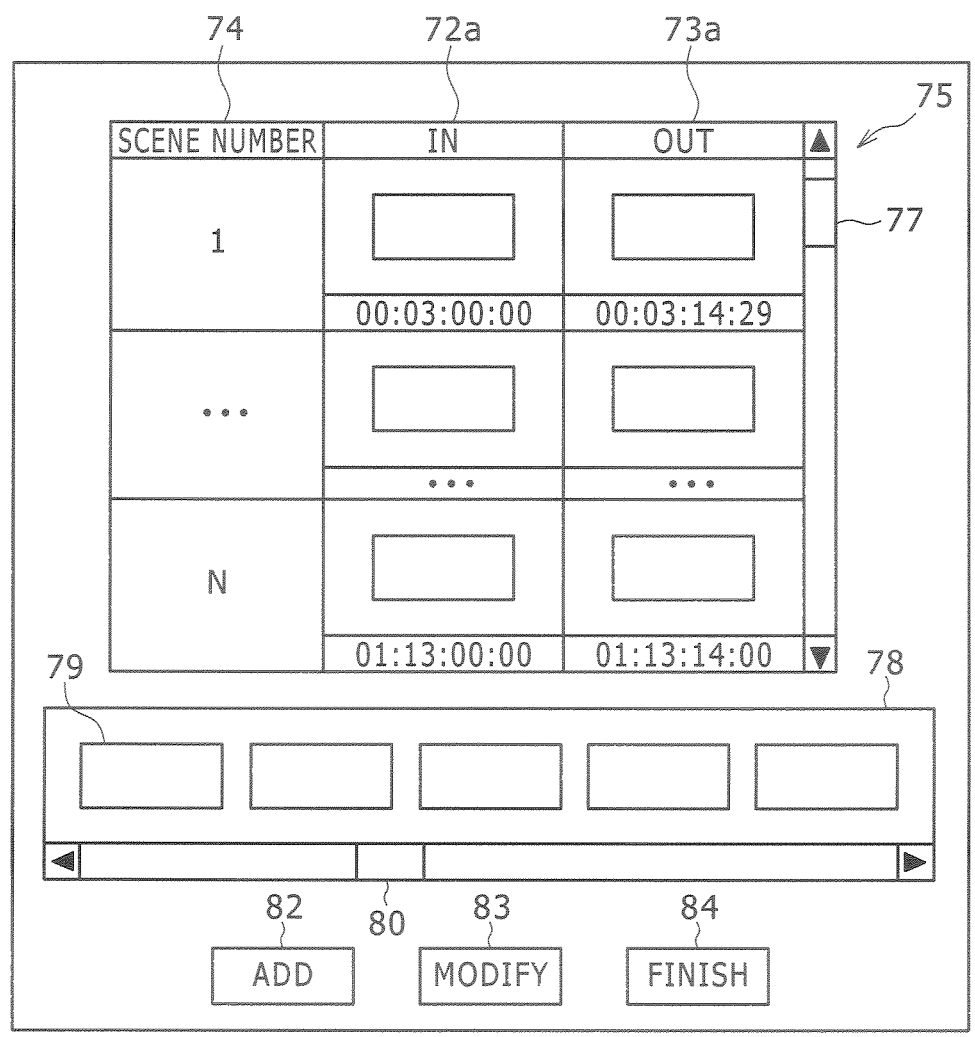
FIG. 13 shows an example of a scene editing screen.

FIG. 13 shows an example of a scene editing screen that appears on the display device 67. This screen is supplied from the scene editing section 68 and displayed on the display device 67.

The editor can operate the scene editing section 68 with a keyboard, mouse, or other input device to generate a scene.

The scene editing screen includes a scene display section 75, a thumbnail display section 78, an Add button 82, a Modify button 83, and a Finish button 84

The thumbnail display section 78 displays thumbnails 79 of images decoded by the decoder 63. The displayed thumbnails are chronologically arranged from left to right.

The displayed thumbnails are, for instance, low-resolution still pictures of frames that constitute image data.

If all the thumbnails cannot be simultaneously displayed in the thumbnail display section 78, they can be horizontally scrolled by operating the mouse or like device to move a slide button 80 in a horizontal scroll bar to the right or left.

The scene display section 75 displays the in point and out point of a scene in relation to a scene number. The scene display section 75 includes a scene number display field 74, an in-point display field 72a, an out-point display field 73a, and a vertical scroll bar 77.

The scene number display field 74 indicates a scene number. From top to bottom, scene numbers (1, 2, 3, . . . ) are arranged in ascending order. The scene numbers indicate the order of scenes that are used with edited image data. The edited image data will be generated in the order indicated by the scene numbers.

The in-point display field 72a specifies the in point for a scene that is indicated in the scene number display field 74. The in-point display field 72a shows a thumbnail of the scene's start frame and a time code.

The in point can be set, for instance, by dragging and dropping a thumbnail corresponding to the in point from the thumbnail display section 78

The out-point display field 73a specifies the out point for a scene that is Indicated in the scene number display field 74. The out-point display field 73a shows a thumbnail of the scene's end frame and a time code.

The out point can be set, for instance, by dragging and dropping a thumbnail corresponding to the out point from the thumbnail display section 78.

The contents displayed in the scene display section 75 can be scrolled by operating the mouse or like device to slide a scroll button in the vertical scroll bar.

The Add button 82 is used to add a new scene to the scene display section 75. When, for instance, the Add button 82 is clicked with the mouse, a new numbered field is added to the scene display section 75. For the new numbered field, the in-point display field 72a and out-point display field 73a are blank. A scene can be added by specifying the in point and out point in such blank fields.

An alternative configuration may be employed so that the editor can specify the position of an additional scene.

The Modify button 83 is used to duplicate, move, delete, or otherwise modify a designated scene.

The Finish button 84 is used to terminate a scene generation process.

FIG. 14A shows an example of a modification screen that appears when the Modify button 83 is selected.

The modification screen 90 shows for instance, a Duplicate button 86, a Move button 88, and a Delete button 89 in addition to the scene display section 75. These buttons are radio buttons so that only one of them can be selected with the mouse or the like.

In FIG. 14A, the Duplicate button 86 is selected so that the modification screen 90 is in a duplication mode.

In the duplication mode, clicking the scene to be duplicated within the scene display section 75 duplicates the scene and adds it to the scene display section 75.

When, for instance, scene 4 is selected as indicated in FIG. 14A, scene 5, which is the same as scene 4, is added as indicated in FIG. 14B.

In FIG. 15A, the Move button 88 is selected so that the modification screen 90 is in a move mode.

In the move mode, the scene to be moved can be dragged and dropped to a move destination within the scene display section 75.

When, for instance, scene 3 in FIG. 15A is dragged and dropped to the location of scene 5, scene 3 moves to the location of scene 5 with the scene numbers assigned to scenes 4 and 5 decremented by one as indicated in FIG. 15B.

In FIG. 16A, the Delete button is selected so that the modification screen 90 is in a deletion mode.

In the deletion mode, a scene in the scene display section 75 can be deleted by clicking it When, for instance, scene 3 is clicked as indicated in FIG. 16A, it is deleted as indicated in FIG. 16B and the scene numbers assigned to the subsequent scenes, that is, scenes 4 and 5, are decremented by one.

FIG. 17 shows an example of a logical structure of a time code list that is generated by a scene generation process.

As indicated in the figure, each scene includes an edit point set, which is composed of an in point and an out point. For example, the in point of scene 1 is a 3-minute, 00-second, 00 frame, and the out point of scene 1 is a 3-minute, 14-second, 29 frame. As is obvious from the example, the time code can be created in 1/100 second increments.

Figure 18:
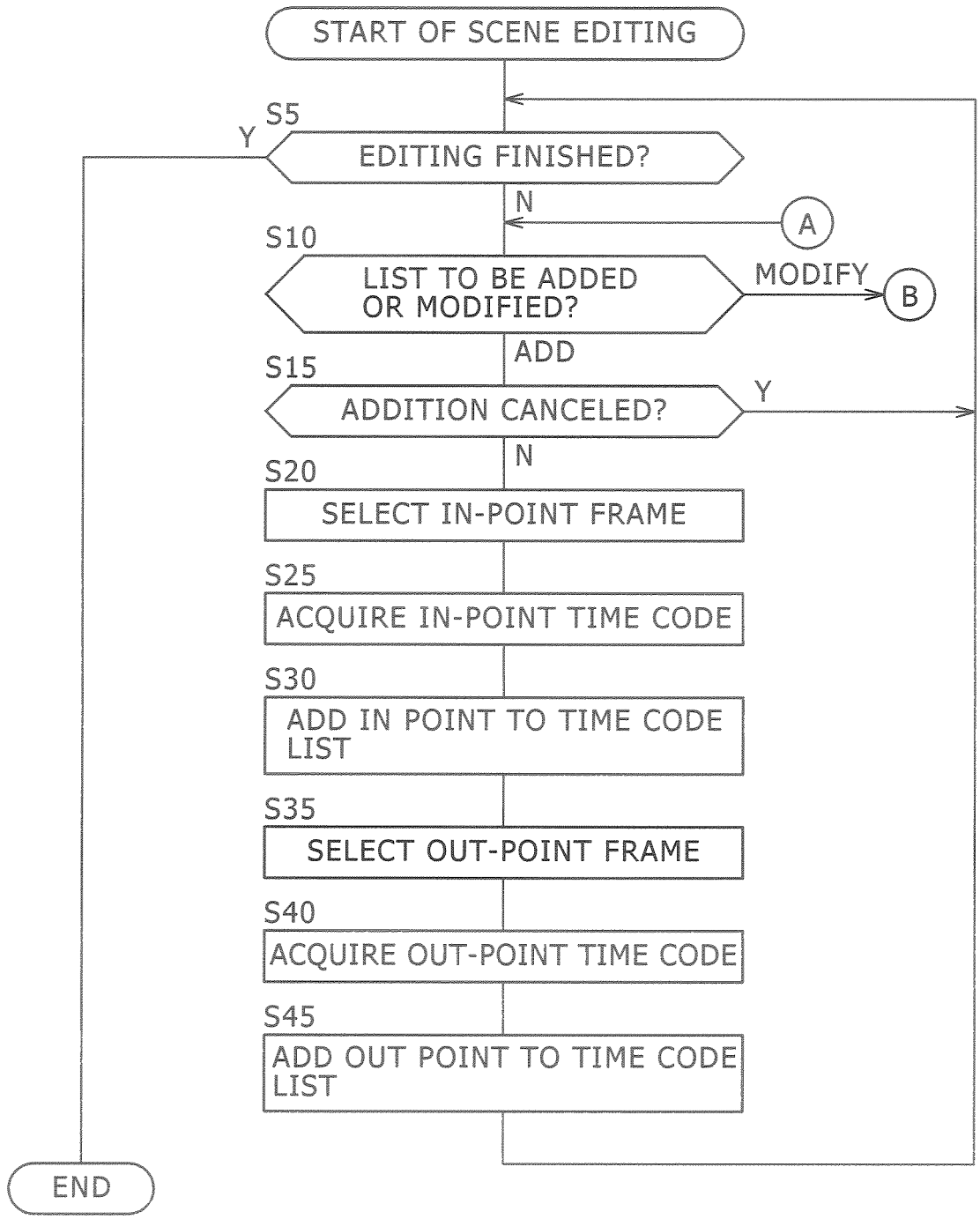
FIG. 18 is a flowchart illustrating steps that are performed during a scene editing process.

FIG. 18 is a flowchart illustrating the steps to be performed during a scene editing process (cut Process).

First of all, the remote editing machine 3 initializes the remote editing machine 3 and starts a scene editing process. To judge whether the scene editing process is finished, the remote editing machine 3 detects whether the Finish button 84 (FIG. 13) is selected (step 5).

If it is judged that the scene editing process is finished (if the query in step 5 is answered "Yes"), the remote editing machine 3 terminates the scene editing process.

If the judgment result obtained in step 5 indicates that the scene editing process is not finished (if the query in step 5 is answered "No"), the remote editing machine 3 judges whether time code addition or modification is selected (step 10).

This judgment is formulated by checking whether the Add button 82 or Modify button 83 is selected from the scene editing screen (FIG. 3).

If the judgment result obtained in step 10 indicates that addition is selected, the remote editing machine 3 perform step 15 to judge whether the selection of addition is canceled (the selection of addition can be canceled with a Cancel button that is not shown in the scene editing screen. If the selection of addition is canceled (if the query in step 15 is answered "Yes"), the remote editing machine 3 returns to step 5.

If, on the other hand, the selection of addition is not canceled (if the query in step 15 is answered "No"), the remote editing machine 3 accepts a thumbnail selection that the editor has made in the thumbnail display section 78, and prompts the editor to select an in-point frame (step 20).

The remote editing machine 3 then acquires an in-point time code from the selected frame (step 25), and records the acquired time code in the editing information recording section 70 (FIG. 11) as the editing information (step 30).

Next, the remote editing machine 3 similarly prompts the editor to select an out-point frame (step 35) acquires an out-point time code from the selected frame (step 40), and records the acquired time code in the editing information recording section 70 (step 45). Finally, the remote editing machine 3 returns to step 5.

The order of in-point and out-point selections may be reversed.

Figure 19:
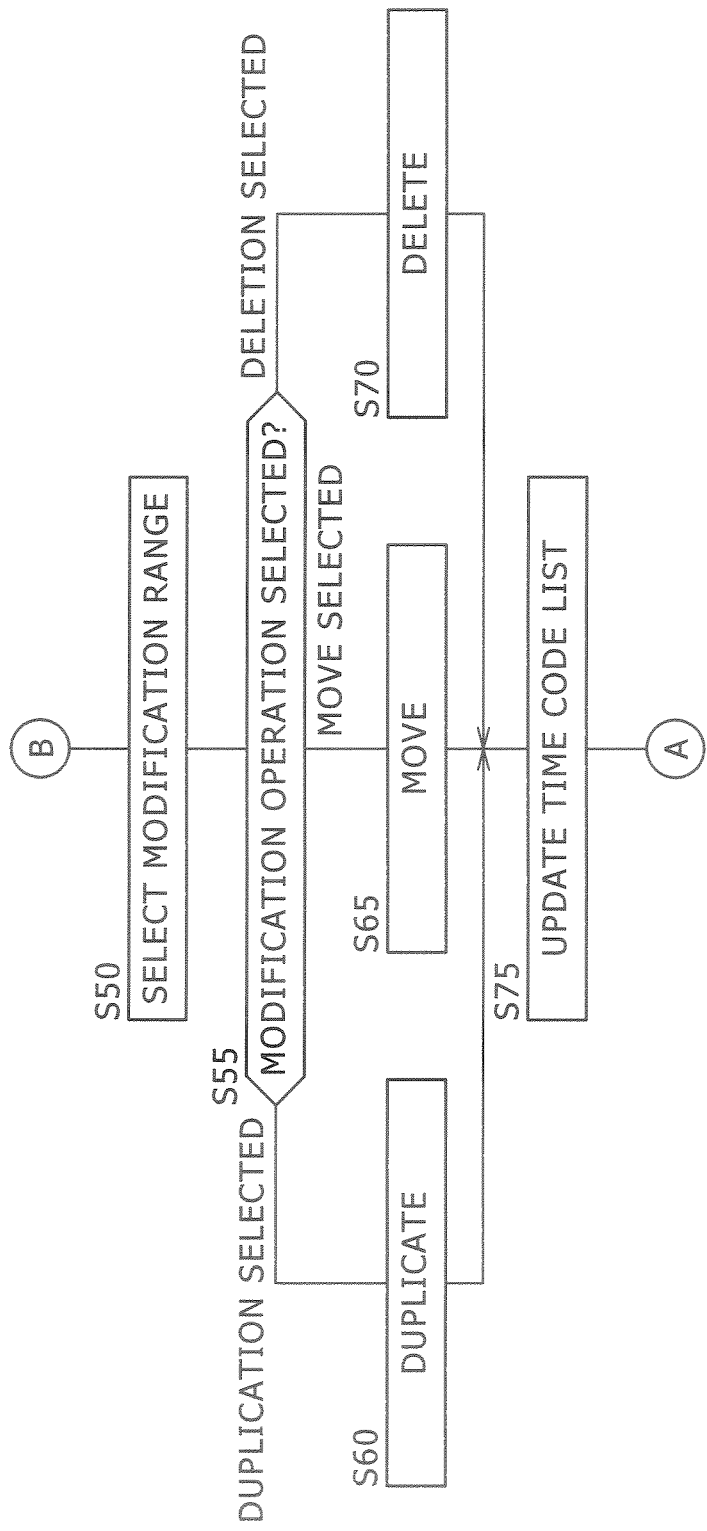
FIG. 19 is a flowchart illustrating steps that are performed for a modification during a scene editing process.

If the Judgment result obtained in step 10 indicates that time code list modification is selected, the remote editing machine 3 performs steps indicated in a flowchart in FIG. 19.

The remote editing machine 3 prompts the editor to select a modification range (a scene targeted for duplication, move, or deletion) (step 50).

Next, the remote editing machine 3 judges whether the Duplicate button 86, Move button 88, or Delete button 89 is selected (step 55).

If the Duplicate button 86 is selected, the remote editing machine 3 duplicates a time code set for the selected scene, which includes the time codes of the in point and out point (step 60), and adds the resulting duplicate to the time code list (step 65) to update the time code list (step 75).

If the Move button 88 is selected, the remote editing machine 3 moves a time code set for the selected scene to a position that is specified as a move destination (step 65), and updates the time code list (step 75).

If the Delete button 89 is selected, the remote editing machine 3 deletes a time code set for the selected scene from the time code list (step 70) and updates the time code list (step 75).

After updating the time code list in step 75, the remote editing machine 3 returns to step 10.

The above example assumes that a set of an in point and out point is to be modified. However, either one of previously specified in-point and out-point can be selected as a modification target.

An alternative configuration may be employed to generate a set of an in point and out point so that when the time code for a specific point is specified directly or by designating a specific frame, the data for a certain period of time containing the specific point is handled as an editing range in accordance with predefined conditions.

In the above example, the generated time code list is stored in the editing information recording section 70. However, an alternative configuration may be employed so that a time code is packetized and transmitted to the main editing machine to let the main editing machine generate a time code list.

Figure 20:
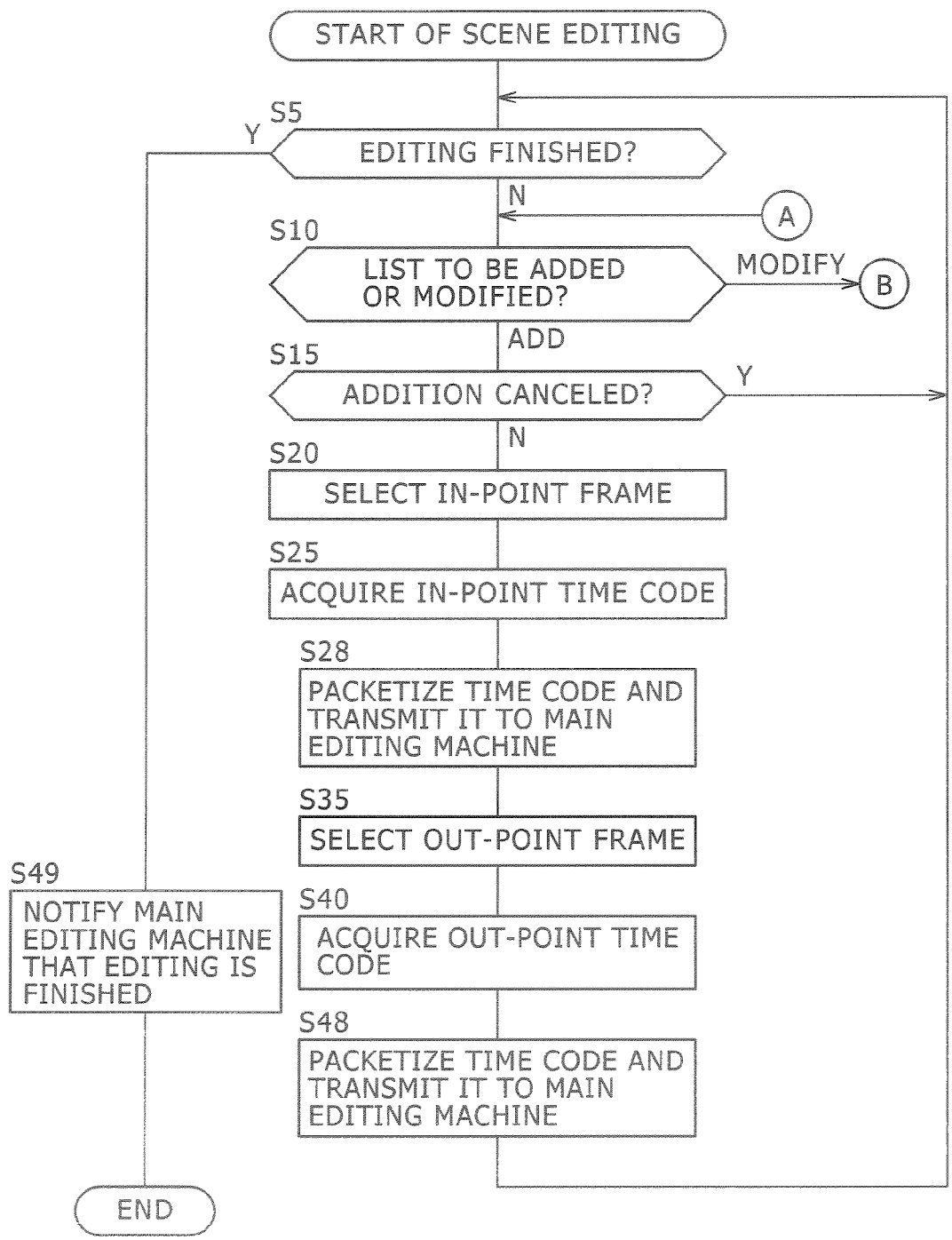
FIG. 20 is a flowchart illustrating steps that are performed for another purpose during a scene editing process.

The processing steps to be performed by the remote editing machine 3 in the above case will be described with reference to a flowchart in FIG. 20. Processing steps that are identical with those indicated in the flowchart in FIG. 18 are assigned the same step numbers as their counterparts and will not be described.

The remote editing machine 3 packetizes the time code with the same timing as for time code transmission to the recording section of the remote editing machine, which is exemplified in FIG. 18, and transmits the packetized time code to the main editing machine 2 via the editing information transmission section 71 (steps 28 and 48).

When a scene editing process is to be terminated, the remote editing machine 3 notifies the main editing machine 2 of the end of editing (step 49).

Figure 21:
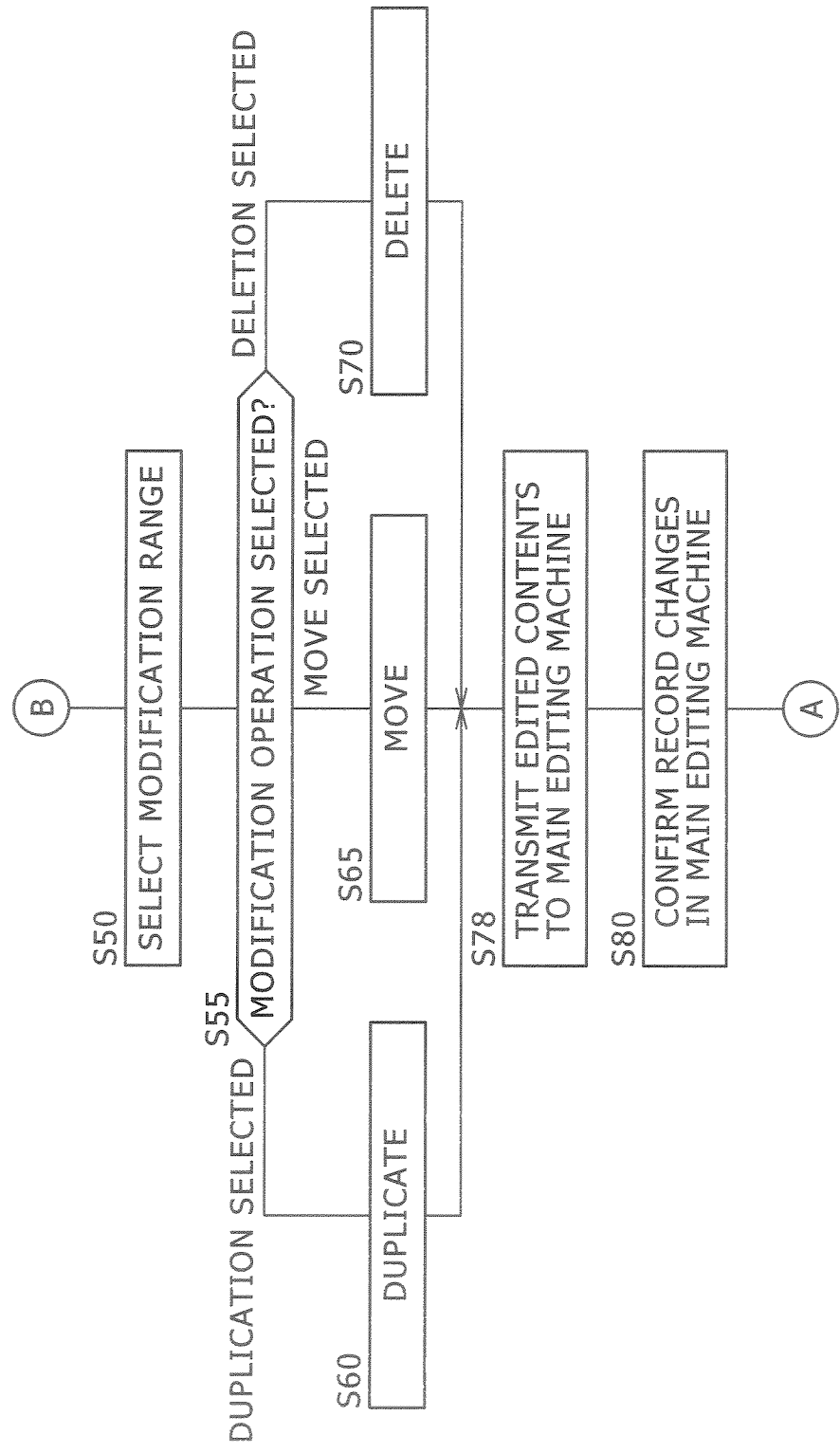
FIG. 21 is a flowchart illustrating steps that are performed for another modification during a scene editing process.

When a modification operation is to be performed, the remote editing machine 3 transmits an edit to the main editing machine 2 as indicated in FIG. 21. In accordance with an response from the main editing machine 2, the remote editing machine 3 confirms that a time code record is changed in the main editing machine 2 (step 80).

In the above editing operation, image data is used to specify the scene. However, when thumbnails of image data are viewed, it may be judged that the entire image content is needed, and no scene editing operation is eventually performed. In such a situation, setup may be performed so that the start and end positions of image content are automatically recorded in the time code list.

A method for recording a time code list in the editing information recording section 18 will now be described.

It is assumed for explanation purposes that the capacity for recording a single time code is b bytes, and that N sets of editing ranges (scenes) are recorded in the in-point and out-point order.

When the start address of a preallocated storage region $N*2*b$ is a0, the in point for the k-th editing target range is written at address $a0+2*b*(k-1)$ with the out point written at address $a0+(2*(k-1)+)*b$.

In the above instance, an alternative is to allocate the recording space $Nmax*2*b$ for the maximum list length Nmax and write a value at a relevant address each time an edit point addition operation is performed.

Another alternative is to allocate a 2b-byte region for new edit points and write a time code in the allocated region when an edit point addition operation is performed.

Another alternative is to generate a structure containing an in point, out point, and next-list reference destination address and perform a recording operation while allocating a space for the new structure upon each time code set addition. Still another alternative is to store a time code, create a list containing a storage destination address read a necessary time code address from the list, and reference the time code itself.

An example of specifying the editing range with a time code has been described above. However, a different piece of information that can be mapped to the time code information about an edit point frame may be used instead of a time code.

For example, a frame number may be used as a constituent. A relative or absolute pointer indicating a storage address for frame or tile data that is hierarchically encoded within the main editing machine may be used. An RTP timestamp, which is added to the RTP header of an RTP packet, may also be used. Since the RTP timestamp is generated at a frequency of 90 kHz, it has adequate time resolution for reproducing a common image data generation time interval of approximately 30 fps.

After scenes, which define an editing range, are specified with image data as described above, the picture quality (the resolution and image quality in the currently used example) is specified for such scenes.

The present embodiment assumes that the picture quality of edited image data can be specified by specifying the hierarchical level to be used to decode a hierarchical code no matter whether the image data is not entirely received.

Even when a part of image data needs to be acquired to confirm the quality of an edited image, the intended purpose is achieved simply by receiving the data representing the difference from the previously received hierarchically encoded data.

The highest edited picture quality achievable is equal to the quality of the original raw image data (resolution and image quality).

Therefore, the remote editing machine 3 is notified, for instance, of the highest hierarchical level of the raw image data when it receives from the main editing machine 2, for instance, the SDP shown in FIG. 10 as a part of an initialization operation at the beginning of image data transfer. The remote editing machine 3 then stores the received information in the editing information recording section 70.

The picture quality editing section 69 references the hierarchical level value of the raw image data stored in the editing information recording section 70, and controls a picture quality selection operation so that the specified hierarchical level value for the edited image data does not exceed the raw image data value.

In this instance, the hierarchical elements for hierarchization can be independently controlled, for instance by reducing the resolution while maintaining high image quality or by using a brightness component only while maintaining high image quality.

In other words, picture quality editing is performed by acquiring the hierarchical level information about the raw image data from the main editing machine 2 and determining the edited picture quality within the range of the acquired information.

FIG. 22 shows an example of a picture quality editing screen that is displayed on the display device 67. This screen opens when a scene editing process is finished.

The picture quality editing screen offers a user interface that can be used to edit the picture quality. It makes it possible to independently specify the hierarchical level for each hierarchical element (image quality or resolution).

The picture quality editing screen includes an image display section 110, a reproducing position display section 111, a reproducing button 113 an image quality selection section 115 a resolution selection section 118, and a scene display section 123.

As described above, the picture quality editing screen includes the image display section 110 and the independent selection sections (image quality selection section 115 and resolution selection section 118) for hierarchical elements. In these selection sections, a desired value within a permissible range can be selected with a knob or the like.

In the example shown in the figure, the image quality and resolution settings can be both varied from hierarchical level 1 to hierarchical level A The raw image data is hierarchized with the image quality divided into seven layers after six wavelet transforms.

The hierarchical level can also be specified for the components although it is not described below.

The hierarchical elements of the picture quality editing screen will now be described.

The scene display section 123 shows a list of scenes that were generated in the scene editing process, and associates the scenes targeted for picture quality editing with scene editing results.

The contents displayed by the scene display section 123 are the same as those displayed by the scene display section 75 shown in FIG. 13. The scene display section 123 displays thumbnails that represent the in-point and out-point frames of a scene. The contents of the scene display section 123 can be scrolled with a vertical scroll bar.

In the scene display section 123, the scene to be subjected to picture quality setup can be selected, for instance, by clicking the mouse on the scene. In the example shown in the figure, scene 2 is selected.

As described above, the picture quality editing section 69 can specify the hierarchical levels of image quality and resolution for each scene.

Further, when, for instance, only some of a series of image frames constituting a particular scene are to be subjected to image quality enhancement or resolution enhancement, that is, when editing is to be performed at different hierarchical element levels, the scene can be divided to change the information about the scene and time code range.

The image display section 110 is an area for reproducing and displaying the image data that is selected in the scene display section 123.

The image display section 110 successively displays the frames constituting a scene so that the editor can view the image data constituting the scene as a motion picture.

The reproducing button 113 controls the reproduction of image data that is selected in the scene display section 123.

The editor can start or stop the reproduction of an image, for instance, by clicking the mouse on the reproducing button 113.

The reproducing position display section 111 indicates the position of the image displayed in the image display section 110. More specifically, the reproducing position display section 111 indicates the image's relative position within a scene.

The reproducing position is indicated by a reproducing position indicator 112. As an image reproduction process progresses the reproducing position indicator 112 moves from the in point (the leftmost end of the reproducing position display section 111) to the out point (the rightmost end of the reproducing position display section 111).

The editor can move the reproducing position to a desired position within a scene by sliding the reproducing position indicator 112 with the mouse or the like.

The image quality selection section 115 is used to specify the image quality hierarchical level (image quality level) of the scene selected in the scene display section 123.

The selectable image quality levels are determined according to the hierarchical information about a raw image, which is transmitted from the main editing machine 2.

In the image quality selection section 115, the editing range is limited in advance in accordance with the acceptable image quality maximum value and minimum value. Further, the selectable settings are indicated by indexes which are integers.

In the example shown in the figure, the image quality is hierarchized into hierarchical levels 1 to 7. The editor can select a desired hierarchical level by moving an image quality knob 116 with the mouse or the like.

The image quality level indexes are provided with the symbols "kl," "kl recv," and "kl org."

The symbol "kl" represents the number of image quality layers specified by an editing operation. The symbol "kl recv" represents the number of layers possessed by the remote editing machine 3. The symbol "k org" represents the number of image quality layers for the raw image data. These values may be indicated for instance, by a color or mark.

The remote editing machine 3 retains the image data for the image quality level specified by kl recv and the lower image quality levels. Therefore, the remote editing machine 3 can display an image in the image display section 110 at a specified image quality level as far as the hierarchical level is between 1 and kl recv.

Thus, the editor can confirm the specified image quality in the image display section 110.

If the specified image quality exceeds kl recv, a prompt is generated to request additional hierarchically encoded data. When the editor is to make a request for additional hierarchically encoded data, the editor requests the main editing machine 2 to transmit additional data, receives the additional data, combines the received additional hierarchically encoded data with the previously received hierarchically encoded data, and displays an image at a high image quality level.

The resolution selection section 118 is used to specify the resolution level for the scene selected in the scene display section 123.

As is the case with image quality, the editing range is limited in accordance with the acceptable resolution maximum value and minimum value.

The selectable resolution levels are determined according to the hierarchical information about a raw image, which is transmitted from the main editing machine 2. The number of selectable resolution hierarchical levels IS equal to the number of wavelet transforms plus one. In the example shown in the figure, hierarchical levels 1 to 7 are selectable.

A resolution setting can be selected by moving a resolution knob 119 with the mouse or the like.

The resolution level indexes are provided with the symbols "kr," "kr recv" and "kr org."

The symbol "kr" represents a resolution level specified for editing. The symbol "kr recv" represents the resolution level of the image data retained by the remote editing machine 3. The symbol "kr org" represents the resolution level of the raw image data.

These values may be indicated, for instance, by a color or mark.

The remote editing machine 3 retains the image data for the resolution level specified by kr recv and the lower resolution levels. Therefore, the remote editing machine 3 can display an image in the image display section 110 at a specified resolution level as far as the hierarchical level is between 1 and kr recv.

Thus, the editor can confirm the specified resolution in the image display section 110.

If the specified resolution exceeds kr recv, a prompt is generated to request additional hierarchically encoded data. When the editor is to make a request for additional hierarchically encoded data, the editor requests the main editing machine 2 to transmit additional data receives the additional data, combines the received additional hierarchically encoded data with the previously received hierarchically encoded data, and displays an image at a high resolution level.

A case where a request for additional hierarchically encoded data is to be issued to the main editing machine 2 for image quality enhancement purposes will now be described.

Figure 23A:
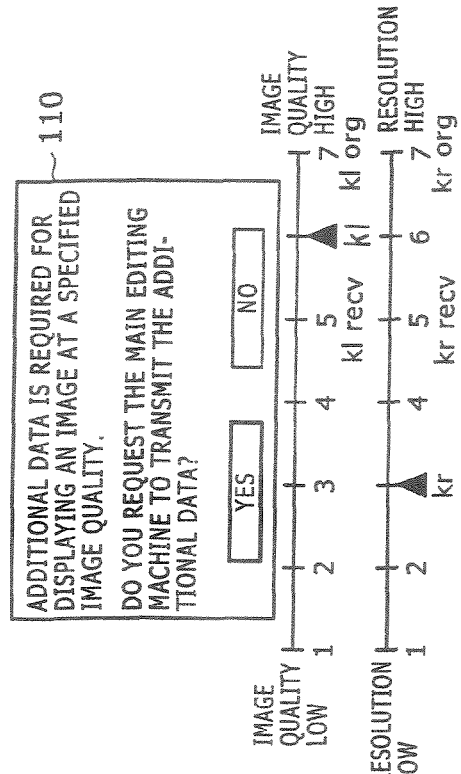
FIGS. 23A to 23C illustrate a case where the picture quality editing screen is used to change the image quality level.
Figure 23C:
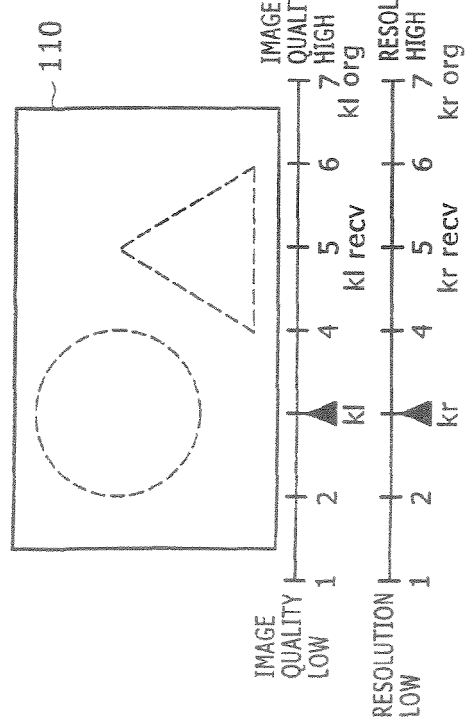
Figure 23B:
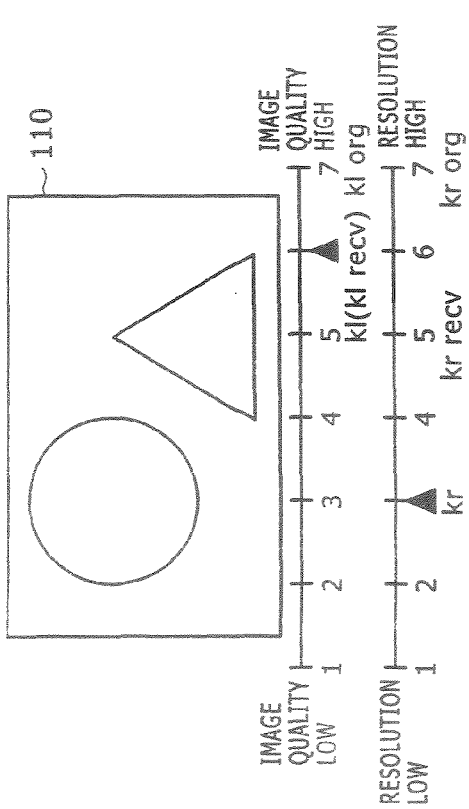

FIGS. 23A to 23C illustrate a situation where the image quality is changed from hierarchical level 3 to hierarchical level 6 while the resolution is maintained at hierarchical level 3.

At first, the image quality is to set to level 3 and the image display section 110 shows an image corresponding to image quality level 3 as indicated in FIG. 23A.

It is assumed that the editor then selects image quality level 6 as indicated in FIG. 23B. In this instance, the highest hierarchical level for the image quality of the image data retained by the remote editing machine 3 is 5. Therefore, a dialog or the like is used as indicated in the figure to ask the editor whether the editor requests the main editing machine 2 to transmit the additional hierarchically encoded data for displaying an image at an image quality level corresponding to hierarchical level 6.

When the editor makes a request for the additional hierarchically encoded data, the remote editing machine 3 sends the request to the main editing machine 2, receives the additional hierarchically encoded data that is transmitted from the main editing machine 2 in compliance with the request, and causes the image display section 110 to display an image at the specified image quality level as indicated in FIG. 23C.

In FIG. 23C, the kl is set to 6 so that the image display section 110 displays an image at image quality level 6.

A case where a request for additional hierarchically encoded data is to be issued to the main editing machine 2 for resolution enhancement purposes will now be described.

FIGS. 24A to 24C illustrate a situation where the resolution is changed from hierarchical level 3 to hierarchical level 6 while the image quality is maintained at hierarchical level 6.

At first, the resolution is to set to level 3 and the image display section 110 shows an image corresponding to resolution level 3 as indicated in FIG. 24A.

It is assumed that the editor then selects resolution level 6 as indicated in FIG. 24P. In this instance, the highest hierarchical level for the resolution of the image data retained by the remote editing machine 3 is 5. Therefore, a dialog or the like is used as indicated in the figure to ask the editor whether the editor requests the main editing machine 2 to transmit the additional hierarchically encoded data for displaying an image at a resolution level corresponding to hierarchical level 6.

When the editor makes a request for the additional hierarchically encoded data the remote editing machine 3 sends the request to the main editing machine 2, receives the additional hierarchically encoded data that is transmitted from the main editing machine 2 in compliance with the request, and causes the image display section 110 to display an image at the specified resolution level as indicated in FIG. 24C.

In FIG. 24, the kr is set to 6 so that the image display section 110 displays an image at resolution level 6.

The following description relates to a case where the specified hierarchical resolution level is higher than that is retained by the remote editing machine 3 and the remote editing machine 3 does not request the main editing machine 2 to transmit additional hierarchically encoded data.

It is assumed, for instance, that hierarchical level 6 is selected as indicated in FIG. 25B although the kr recv is hierarchical level 5 as indicated in FIG. 25A Then, the image display section 110 asks the editor whether the editor makes a request for additional hierarchically encoded data. It is assumed, however, that the editor does not make such a request.

The image display section 110 is then informed as indicated in FIG. 25C that the specified resolution is higher than the currently used one, and an image is displayed at an available resolution level.

The same also holds true for the image quality. If the specified hierarchical level is higher than the image quality level retained by the remote editing machine 3 and no additional hierarchically encoded data is requested, the image display section 110 indicates so.

A case where the image data is used to specify an ROI (Region of Interest) will now be described. The ROI is a technology for preferentially assigning a bit rate to a designated region or setting a higher picture quality level for the designated region than for the other regions.

Conversely, a lower picture quality level can be set for the designated region than for the other regions.

In the present embodiment, it is possible to set an ROI on an individual tile basis.

Figure 26:
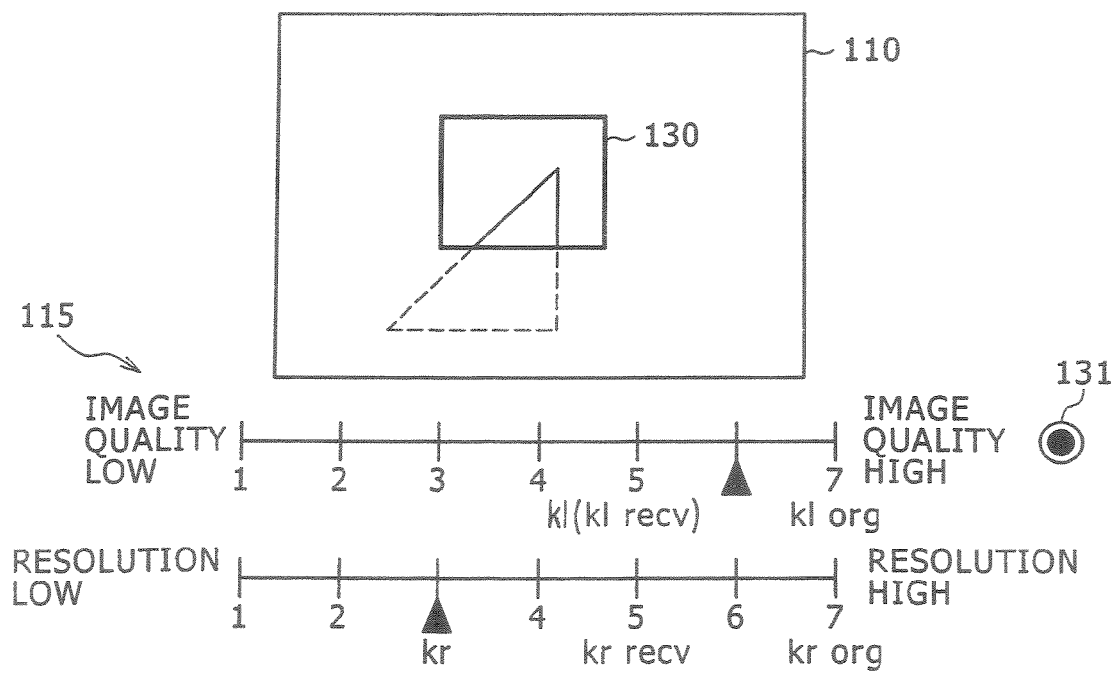
FIG. 26 shows an example of specifying an ROI.

FIG. 26 shows an example of ROI setup.

When an ROI within an image is specified within the image display section 110, for instance, by defining a region with a pen object, the editing information recording section 70 records for a tile position corresponding to the ROI a hierarchical level count of the layer used for image quality that is different from the hierarchical level counts of the other positions.

An ROI check box 131 is provided as indicated in the example shown in the figure. While this check box is selected, the image quality of the ROI can be set with the image quality selection section 115. While the check box is not selected, the image quality of a region other than the ROI can be set.

In the example shown in the figure, the ROI 130 is specified at the center of an image so that the image quality of the ROI is higher than that of the other region.

Further, it is possible to detect an interesting object by performing image processing or the like and raise the picture quality of a region containing the interesting object.

Figure 27:
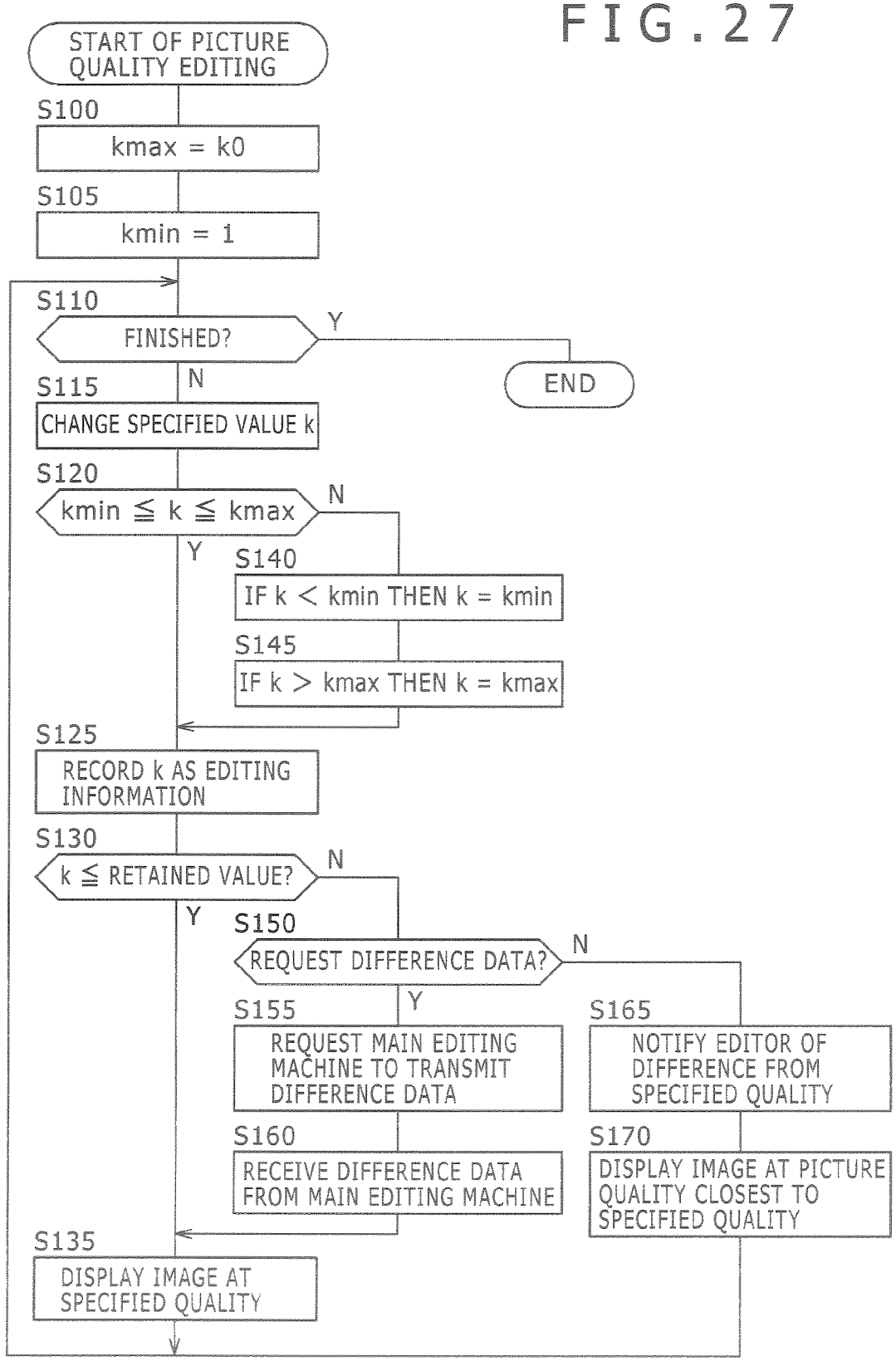
FIG. 27 is a flowchart illustrating an picture quality editing procedure.

A picture quality editing procedure will now be described with reference to a flowchart in FIG. 27. The process indicated in this flowchart is performed on each of the hierarchical elements (image quality, resolution, etc.). However, the following description deals with one of the hierarchical elements.

First of all, the remote editing machine 3 sets the upper-limit value kmax (step 100) and sets the lower-limit value kmin (step 105) while referencing the picture quality of the raw image data transmitted from the main editing machine 2, which is written, for instance, in the SDP's extended section.

In the example shown in the figure, the values kmax and kmin are set to k0 and 1, respectively.

Step 110 is then performed to judge whether a picture quality editing process is to be finished if the process is to be finished (if the query in step 110 is answered "Yes"), the editing result is recorded in the editing information recording section 70 as editing information to terminate the process.

If, on the other hand, the process is not to be finished (if the query in step 110 is answered "No"), the hierarchical element level k specified by the editor is accepted to change the hierarchical element setting to the specified value k (step 115).

Next, the main editing machine 2 performs step 120 to judge whether the value k is between kmin and kmax, that is, within the picture quality range of the raw image data.

If the value k is outside the above range (if the query in step 120 is answered "No") and smaller than the value kmin the value k is set to kmin (step 140). If the value k is greater than the value kmax, the value k is set to kmax (step 145).

If, on the other hand, the value k is between kmin and kmax (if the query in step 120 is answered "Yes") or if the value k is set In step 140 or 145, the value k is recorded in the editing information recording section 70 as the editing information (step 125). Next the remote editing machine 3 judges whether the value k is within the picture quality range of the image data currently retained by the remote editing machine 3 (step 130). If the value k is within the picture quality range of the retained image data (if the query in step 130 is answered "Yes"), the image display section 110 displays an image at the picture quality level specified by the value k.

If, on the other hand, the value k is not within the picture quality range of the retained image data (if the query in step 130 is answered "No"), step 150 is performed to ask the editor whether the editor requests the main editing machine 2 to transmit hierarchically encoded data representing the difference.

If the editor makes a request for the hierarchically encoded data representing the difference (if the query in step 150 is answered "Yes"), step 155 is performed to request the main editing machine 2 to transmit the hierarchically encoded data representing the difference. Consequently, step 160 is performed to receive the hierarchically encoded data transmitted from the main editing machine 2.

The received hierarchically encoded data is depacketized by the depacketizer 62 (FIG. 11), decoded by the decoder 63, and added to the hierarchically encoded data that has already been stored in the temporary storage device 66.

The main editing machine 2 then displays the image data at the specified picture quality level (step 135).

If, on the other hand, the editor does not make a request for additional hierarchically encoded data (if the query in step 150 is answered "No"), step 165 is performed to notify the editor that the image in the image display section 110 is not displayed at the specified picture quality level. Further, the image display section 110 uses the currently retained image data to display an image at a picture quality level that is closest to the specified picture quality (step 170).

As described above, it is possible to specify a scene and specify the picture quality for the specified scene.

FIG. 28 shows an example of a logical configuration of editing information that is stored in the editing information recording section 70

As shown in the figure, the editing information includes a scene number 141, an in point 142, an out point 143, an image quality level 144, a resolution level 145, an ROI image quality 146, and an ROI tile number 147.

The scene number 141 is a number assigned to a scene.

The in point 142 and out point 143 are the in point and out point of a scene.

The image quality level 144 is an image quality level that is specified for a scene.

The resolution level 145 is a resolution level that is specified for a scene.

The ROI image quality 146 is an image quality level that is specified for an ROI in a situation where the ROI is specified for a scene.

The ROI tile number 147 is a number assigned to a tile that is designated as an ROI.

An alternative configuration may be employed so as to perform image quality level setup for each tile as indicated in FIG. 29 and specify the ROI accordingly.

In the example shown in the figure, image quality level 5 is set for tile No. 5, and image quality level 3 is set for the other tiles.

A case where a mobile terminal is used as the remote editing machine 3 will now be described. Using a mobile terminal as the remote editing machine 3 makes it easy to perform editing and other operations at a shooting site.

Figure 30A:
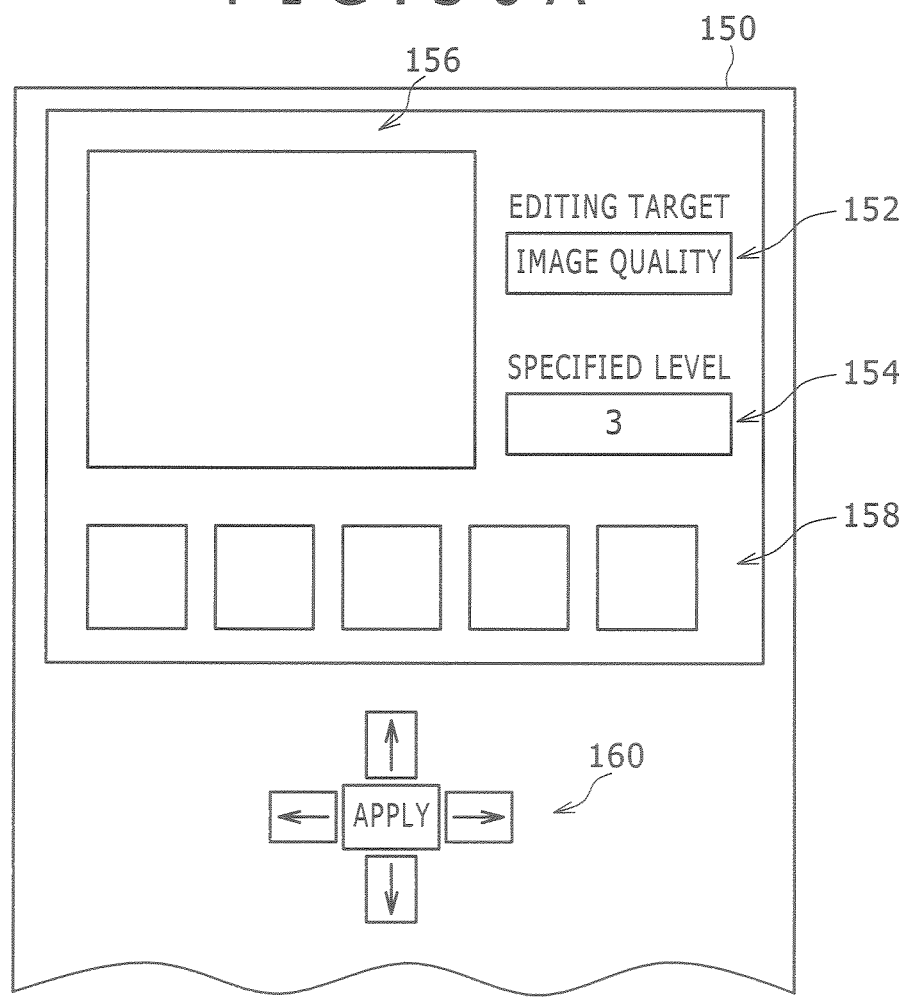
FIGS. 30A to 30C illustrate an operating control section of the remote editing machine that is formulated by a mobile terminal.

FIG. 30A shows an operating control section of the remote editing machine 3 that is formed by a mobile terminal. The remote editing machine 3 includes a display. Formed on the display are an image display section 156, an editing target selection section 152, a level selection section 154, and a thumbnail display section 158.

An operating control section 160 is formed outside the display. The editor uses the operating control section to perform edits.

As shown in the figure, the operating control section 160 may include buttons and a jog dial. Operating the operating control section 160 makes it possible to switch between items displayed in the image display section 156, and select a menu and a menu item.

The thumbnail display section 158 displays leading-frame thumbnails of generated scenes. Received image data is used to display a scene in the image display section 156. The operating control section 160 is operated for scene cutting.

A scene can be selected by manipulating the operating control section to select a thumbnail from the thumbnail display section 158. The selected scene becomes a picture quality editing target.

Figure 30B:
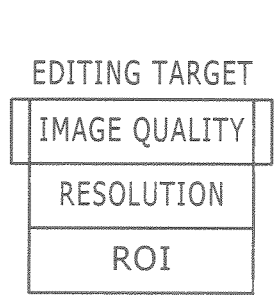

As shown in FIG. 30B, the editing target selection section 152 allows the operating control section 160 to specify whether the image quality, resolution, or ROI of the scene selected in the thumbnail display section 158 is to be edited.

Figure 30C:
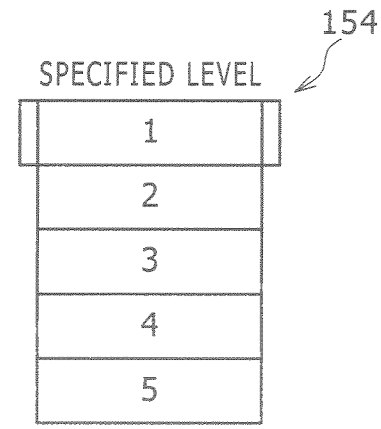

As shown in FIG. 30C, the level selection section 154 can select a hierarchical level that is to be used for the edited image data for an item selected in the editing target selection section 152.

Figure 31:
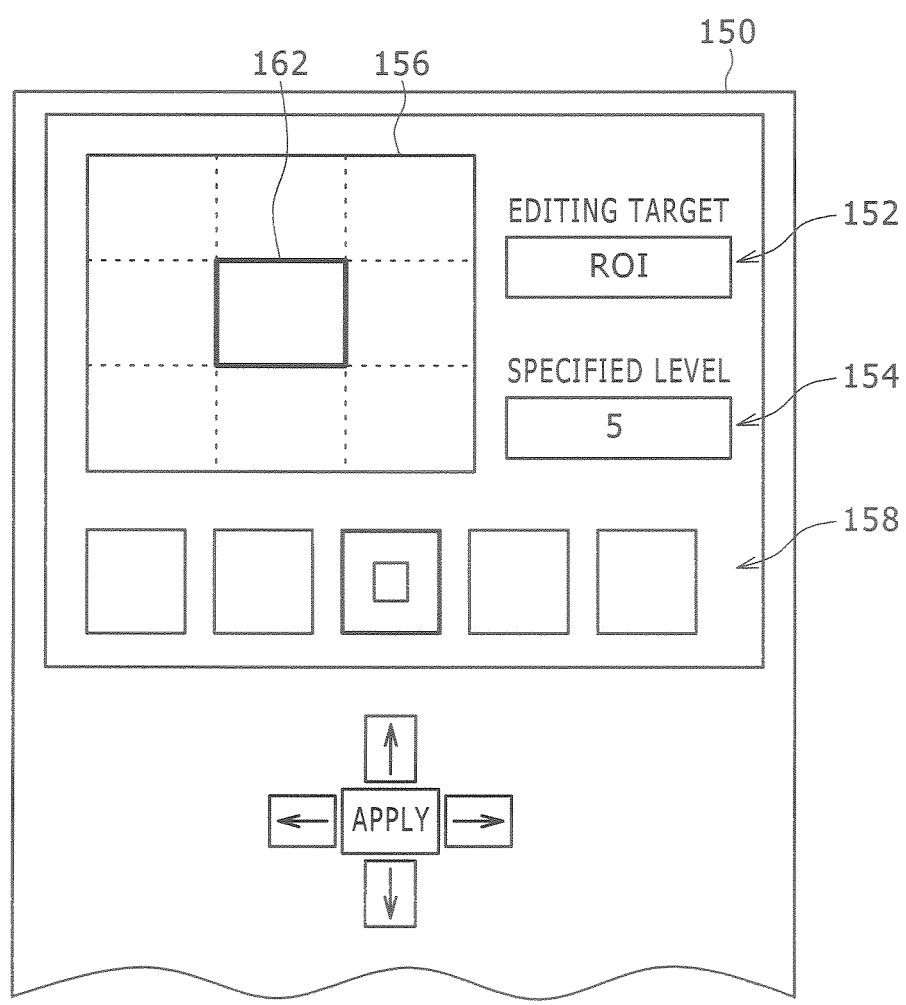
FIG. 31 illustrates a case where an ROI is to be specified with the mobile terminal.

When the ROI is to be specified, the editing target selection section 152 is used to select "ROI," and the operating control section 160 is manipulated to select a tile that is to be designated as the ROI in the image display section 156, as shown in FIG. 31. When the ROI is to be specified, tile boundaries are displayed so that at least one tile can be selected.

The image quality of the specified ROI can be specified with the level selection section 154.

In the remote editing machine 3 that has been described above, the network interface 61 functions as data reception means that receives hierarchically encoded data transmitted from the main editing machine 2.

The depacketizer 62, decoder 63, temporary storage device 66, and display device 67 constitute reproducing means that reproduces an image.

The scene editing section 68 and picture quality editing section 69 constitute editing means that accepts an editing operation performed by the editor.

The scene editing section 68, picture quality editing section 69, and editing information recording section 70 constitute editing information generation means that generates editing information.

The picture quality editing section 69 accepts a hierarchical level selection for each hierarchical element (resolution, image quality, or other element defining the picture quality). The editing information recording section 70 handles editing information that includes such a hierarchical level selection.

The generated editing information is transmitted from the editing information transmission section 71 to the main editing machine 2. It forms data request means that requests the main editing machine 2 to transmit hierarchically encoded data necessary for the generation of edited image data.

The editing control section 73 forms edited image data generation means that generates edited image data by using hierarchically encoded data previously received from the main editing machine 2 and the additionally transmitted hierarchically encoded data (in a situation where the previously received hierarchically encoded data does not suffice).

The picture quality editing section 69 functions as hierarchical level selection means that accepts the editor's hierarchical level selections for hierarchical elements, such as a resolution level and image quality level, when the display device 67 displays an image. The temporary storage device 66, decoder 63, and display device 67 reproduce an image at the selected hierarchical levels.

Further, the picture quality editing section 69 functions as hierarchical level presentation means that causes the display device 67 to display, for instance, a received hierarchical level, the hierarchical level of raw image data, and the currently selected hierarchical level when the editor edits the picture quality.

If the hierarchical level of the image reproduced by the editor differs from the hierarchical level specified by the picture quality editing section 69, the picture quality editing section 69 functions as warning display means that displays a warning as shown in FIG. 25C.

Figure 32:
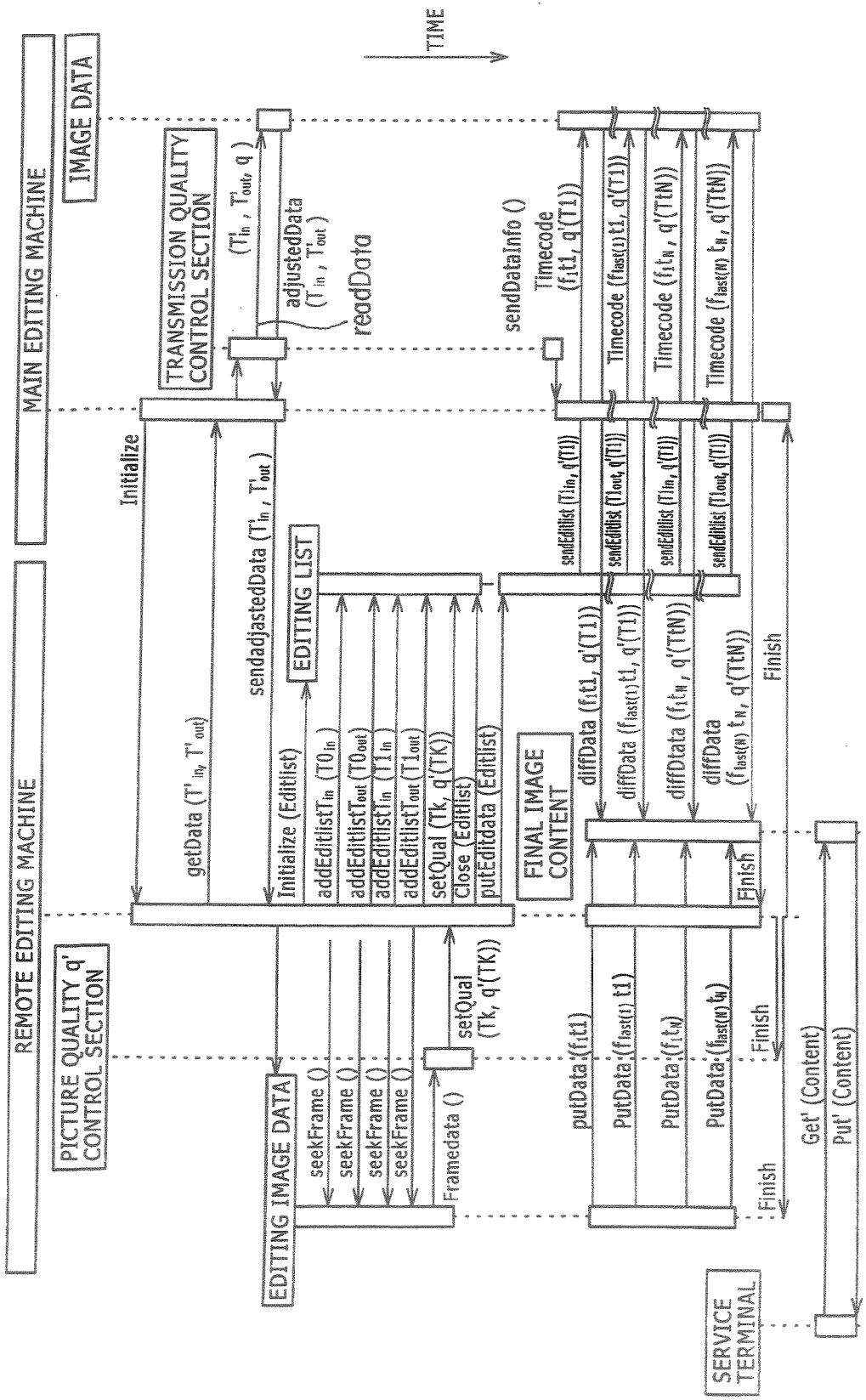
FIG. 32 illustrates an editing sequence that is followed by a remote editing system.

An editing sequence performed in the remote editing system 1 will now be described with reference to FIG. 32.

First of all, the main editing machine 2 sends an editing start signal to the remote editing machine while raw image data is hierarchized and stored in the main editing machine 2.

The remote editing machine 3 performs initialization for instance, by allocating a work memory and a thumbnail data storage memory and initializing an editing information table.

After initialization, the remote editing machine 3 makes a request for thumbnail data by issuing a thumbnail reception signal (getData(T' in, T' out)).

The main editing machine 2 transmits adequate thumbnail creation data for achieving a desired quality in accordance with the raw image data in the main editing machine 2.

The main editing machine 2 issues instructions (readData (T' in, T' out, q')) for reading the T' in to T' out data at a picture quality level specified by aforementioned transmission quality control section, reads adjusted data (ad ustedData(T' in, T' out)) from the image data section, and transmits the adjusted data to the remote editing machine 3 (sendadjustedData).

In the above instance, the raw image data is read and distributed to the remote editing machine 3 while control is exercised over the read amount and transmission amount in accordance with the transmission rate, which is calculated from the status of the network 4 interconnecting the editing machines, and the picture quality (resolution and image quality) specified for thumbnail images by the transmission quality control section 16 for the main editing machine 2.

The remote editing machine 3 receives image data, searches for a frame while viewing thumbnails displayed in the image display section 110 (seekFrame( )), and writes determined edit points in the editing information (addEditlist-Tin(Tk in), addEditlistTout(Tk out)). The value k is an integer between 1 and N.

Repeating the above operation determines the scenes (T1 . . . Tk, . . . TN) that are used for edited image data.

For scene Tk, the picture quality is specified by specifying the hierarchical levels for use with edited image data for hierarchical elements such as resolution and image quality (editQual(Tk')).

During picture quality editing, editing data is read with Framedata( ) to determine the quality while varying the thumbnail's picture quality.

If the data whose picture quality is higher than that can be displayed by the received thumbnail data is required for detailed study during editing, reqData, getData (not shown) is used to receive difference-representing hierarchically encoded data from the main editing machine 2.

When the picture quality is determined by an editing operation, the hierarchical levels of the hierarchical elements are written as the editing information (setQual(Tk', q')). When an editing operation in the remote editing machine 3 terminates, the remote editing machine 3 generates edited image data in accordance with the editing information.

First of all, the main editing machine 2 is requested (sendEditlist(flTk, q'(Tk))) to transfer to the remote editing machine the data for defining the picture quality (q'Tk) of frames (fltk) indicated by the time codes (TkinTkout) of edit points within the editing range (Tk) indicated in the editing list.

The main editing machine 2 compares the received information against the history of transmitted hierarchically encoded data, which is recorded, for instance, in the transmission quality control section 16, and transmits the difference-representing hierarchically encoded data (diffData (flTk, q'(Tk)) to the remote editing machine 3.

The remote editing machine 3 completes the edited image data by using the already possessed hierarchically encoded data and the picture quality difference data (hierarchically encoded data representing the difference) received from the main editing machine 2.

Here, it is assumed that the main editing machine 2 calculates the difference from the already transmitted hierarchically encoded data. Alternatively, however, the remote editing machine 3 may calculate the difference between the already received hierarchically encoded data and the necessary hierarchically encoded data, and transmit only a request for the difference to the main editing machine 2.

The completed edited image data is used in compliance with a request from a service terminal that receives distributed content. Typical content distribution services would be FTP-based individual file transfer HTTP streaming and RTP streaming The edited image data storage device 72 may be physically removed and transported, or the data may be copied to a removable storage medium and transported.

Figure 33:
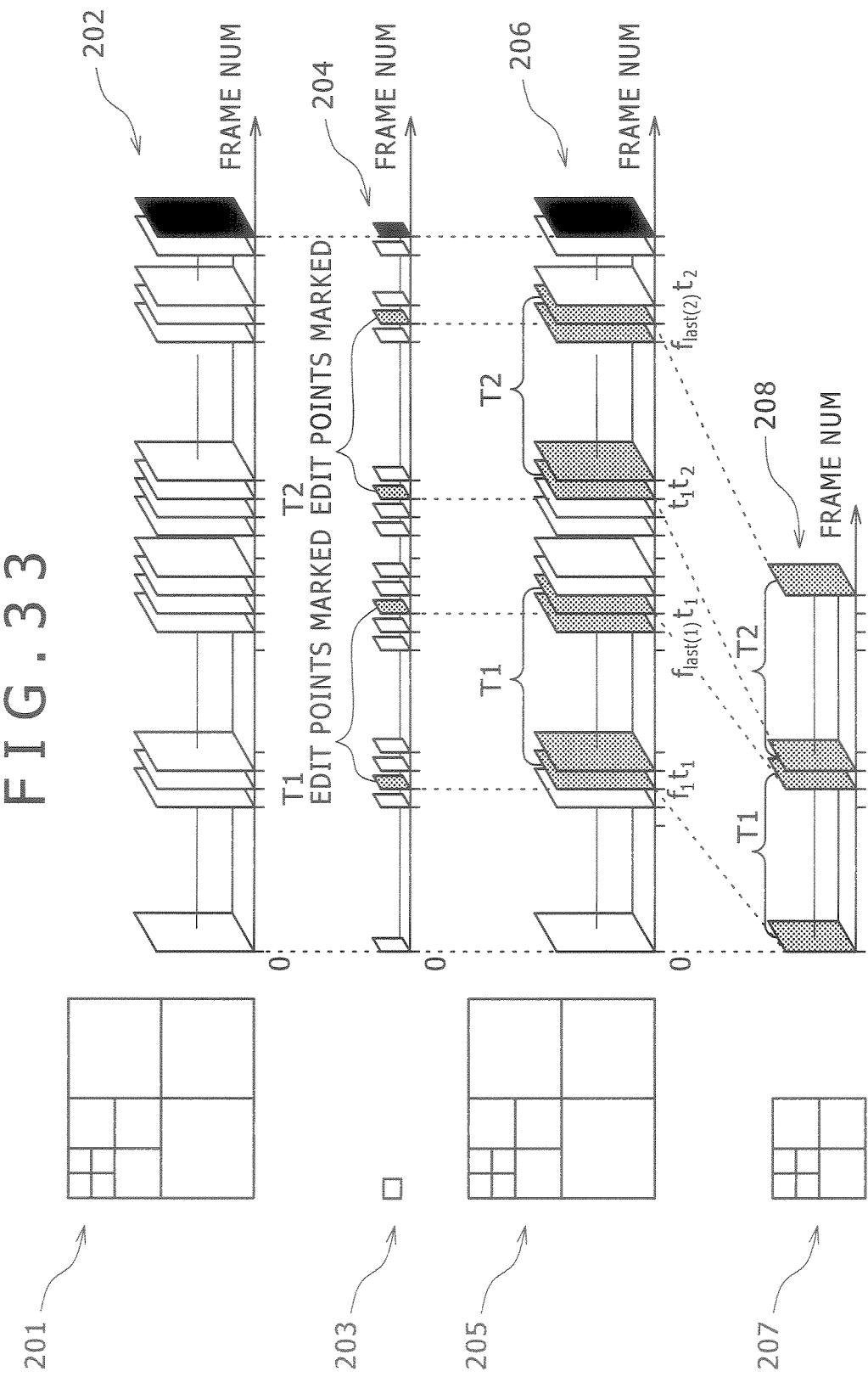
FIG. 33 is a conceptual diagram illustrating how image data is stored in the main editing machine and remote editing machine.

FIG. 33 is a conceptual diagram illustrating how image data is stored by the main editing machine 2 and remote editing machine 3. Frame train 202 represents the raw image data storage state prevailing in the image data storage device 9 of the main editing machine 2. In the figure, the time base is provided rightward. The leftmost frame is a frame at the start position of the raw image data. The rightmost frame is a frame at the end position. The same also holds true for frame trains 204, 206, and 208.

Frame 201 of the main editing machine image data indicates the resolution-based hierarchical levels of frames constituting frame train 202 and corresponds to FIG. 6. It should be noted that "3LL" and other similar symbols are omitted.

As shown in the figure, the frames constituting frame train 202 contain size ⅛ (resolution level 0), size ¼ (resolution level 1), size ½ (resolution level 2), and size ¹⁄₁ (resolution level 3) hierarchically encoded data.

Frame train 204 of the main editing machine image data represents the hierarchically encoded data storage state prevailing in the temporary storage device 66 of the remote editing machine 3.

Frame 203 indicates the resolution-based hierarchical levels of frames constituting frame train 204.

As shown in the figure, the frames constituting frame train 204 contain size ⅛ (resolution level 0) hierarchically encoded data.

The reason is that the main editing machine 2 has adjusted the picture quality so as to transmit the size ⅛ hierarchically encoded data, which is among the raw image data, to the remote editing machine 3.

The editor performs edits while referencing frame train 204 with the remote editing machine 3.

The figure indicates that the in points and out points of N scenes T1 to TN (N=2) are marked due to editing in frame train 204.

Frame train 206 of the main editing machine image data represents the raw image data stored in the image data storage device 9 of the main editing machine 2, and indicates the relationship to the editing result of frame train 204.

Frame 205 indicates the resolution-based hierarchical levels of the frames constituting frame train 206 and is the same as frame 201.

In frame train 206, scenes T1 to TN are marked in relation to the N scenes T1 to TN of frame train 204

Frame train 208 of the main editing machine image data represents the storage state of the edited image data stored in the edited image data storage device 20 of the remote editing machine 3.

Frame 207 indicates the resolution-based hierarchical levels of frames constituting frame train 208 and contains size ½ (resolution level 2) hierarchically encoded data.

As described above, the edited image data is generated by extracting size ½ code data from the scenes T1 to TN of frame train 206.

For example, the above extraction process can be performed as described below.

When, for instance, edited image data is to be generated by using only the 3LL region (⅛ size) of each frame, the 3LL region is read from the currently read frame and the read pointer is moved to the image data leading region of the next frame. When the 3LL region is read from the frame, a switch is made to the next frame.

As described above, the edited image data can be generated by repeating within a scene range a process for reading desired hierarchically encoded data from each frame on a frame train.

When the above process is performed all the hierarchically encoded data (3HL, 3HH, 2LH, 2HT, 2LL, 1LH, 1HL, and 1HH) stored in the image data storage device 9 need not be transmitted to the remote editing machine 3. Further, all the hierarchically encoded data need not be read from the image data storage device 9 when edited image data is to be generated. Therefore, it is possible to reduce the transmission time and processing time.

FIG. 33 shows a situation where resolution-based hierarchical level adjustments are made with the scene specified. However, image quality level adjustments can also be made.

If no raw image data is needed, unnecessary hierarchically encoded data may be erased from the image data storage device 9 or the storage region may be reallocated after erasure.

Figure 34:
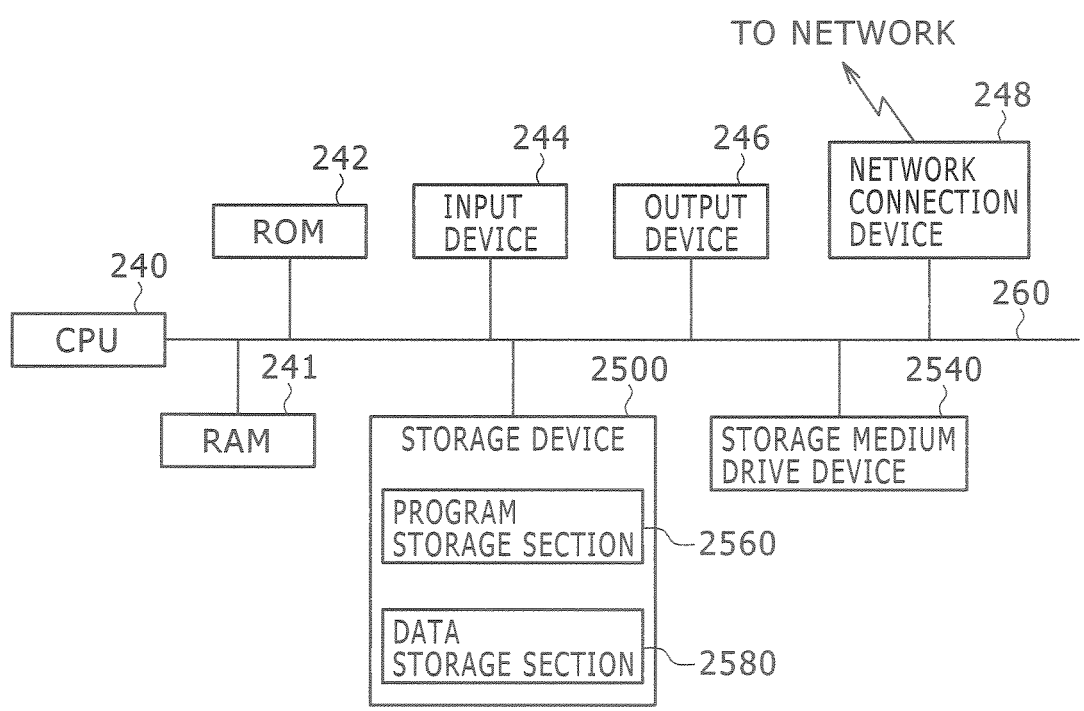
FIG. 34 shows a typical hardware configuration of the main editing machine.

FIG. 34 shows a typical hardware configuration of the main editing machine 2.

The main editing machine 2 includes a CPU 240, a ROM (Read Only Memory) 242, a RAM (Random Access Memory) 241, an input device 244, an output device 246, a network connection device 248, a storage device 2500, and a storage medium drive device 2540. These components are interconnected via a bus line 260.

The CPU 240 is a central processing unit that performs various processes in accordance with programs stored in the ROM 242, RAM 241, and storage device 2500.

The CPU 240 executes an editing program on the main editing machine side to form various component elements indicated in FIG. 2, such as the encoder 10, buffer 11, packetizer 12, transmission quality control section 16, and editing control section 17, and exercise a remote editing function.

The ROM 242 is a read-only memory that stores basic programs and parameters required for allowing the main editing machine 2 to function.

The ROM 241 is a random-access memory that is capable of writing and erasing data. For example, it provides a working memory when the CPU 240 transmits hierarchically encoded data or generates edited image data in accordance with editing information.

The input device 244 is a keyboard, a mouse, a joystick, or the like. It enables the main editing machine operator to reproduce or reedit raw image data.

Further, overall management and maintenance can be performed on raw image data and main editing machine 2 by operating the input device 244.

The output device 246 is a display, a speaker, a printer, or the like. It enables the main editing machine operator to reproduce and display raw image data or display editing information transmitted from the remote editing machine 3.

If the image data contains audio data, it can be output from the speaker.

The storage device 2500 is a large-capacity storage device such a hard disk drive. The CPU 240 can read data from and write data onto the storage device 2500.

Typically, the storage device 2500 uses a large-capacity hard disk. However, the storage device 2500 may alternatively be a combination of a magneto-optical disk, a magnetic disk, a semiconductor storage device, or other storage medium and a storage medium drive device that drives such a storage medium.

The storage device 2500 includes a program storage section 2560, which stores various programs, and a data storage section 2580, which stores various data.

The program storage section 2560 stores, for Instance, an editing program for exercising a remote editing function and an OS (Operating System) for enabling the main editing machine 2 to exercise file input/output and other basic functions.

In the data storage section 2580, the image data storage device 9 (FIG. 2) is formed to store raw image data and the like.

The storage medium drive device 2540 performs a data read/write operation by driving a semiconductor memory, magneto-optical disk, magnetic disk, or other removable storage medium.

When such an operation is performed, the raw image data can be read from the storage medium.

The network connection device 248 is an interface that connects the main editing machine 2 to the network 4. It forms the network interface 15 (FIG. 2).

The configuration of the main editing machine 2 has been described. The hardware configuration of the remote editing machine 3 is basically the same as that of the main editing machine 2.

The remote editing machine 3 incorporates an editing program that implements the editing functions of the remote editing machine When the CPU executes the editing program, the remote editing machine exercises the aforementioned remote editing functions such as those for editing information creation and edited image data generation.

The present embodiment has been described above. However, the present embodiment can be variously modified.

For example, the edited image data stored in the edited image data storage device 72 can be distributed to a user terminal or the like via the network 4.

In the above instance, the remote editing machine 3 is provided with a distribution site or edited image data distribution so that the edited image data is transmitted to a user terminal accessing the distribution site.

The edited image data may be distributed through downloading or distributed through streaming.

Further, the edited image data can be transmitted, for instance, to a TV station terminal for broadcasting purposes.

Furthermore, the edited image data can be duplicated and stored, for instance, on a storage medium, and supplied to the user.

The present embodiment is configured so that the remote editing machine 3 temporarily stores the editing information and transmits it to the main editing machine 2. However, an alternative configuration may be employed so that the editing information is sequentially transmitted to the main editing machine 2 while the remote editing machine 3 is engaged in an editing operation.

In the above alternative configuration for example, the remote editing machine 3 packetizes the editing information and outputs the resulting packets to the network 4 for transmission to the main editing machine 2.

The main editing machine 2 then sequentially extracts difference-representing hierarchically encoded data from the raw image data in accordance with the editing information, and transmits the extracted data to the remote editing machine 3.

Another alternative configuration may also be employed so that the main editing machine 2 stores the sequentially transmitted editing information and transmits the difference-representing hierarchically encoded data upon receipt of an editing termination instruction from the remote editing machine 3.

Figure 35:
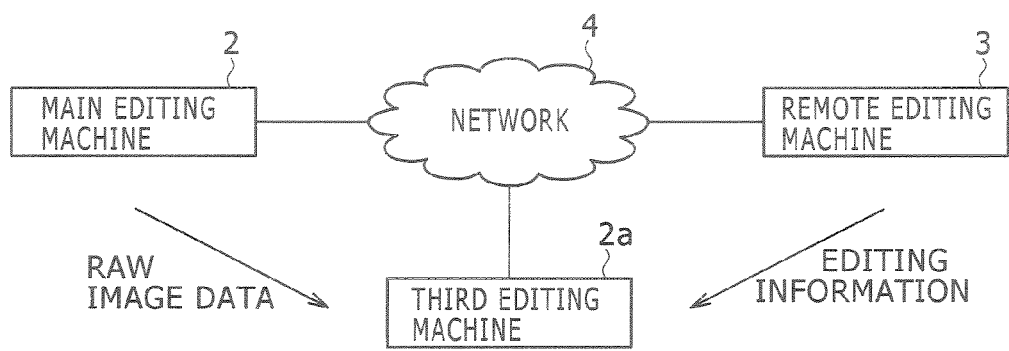
FIG. 35 illustrates an extended example of an embodiment of the present invention.
Figure 36:
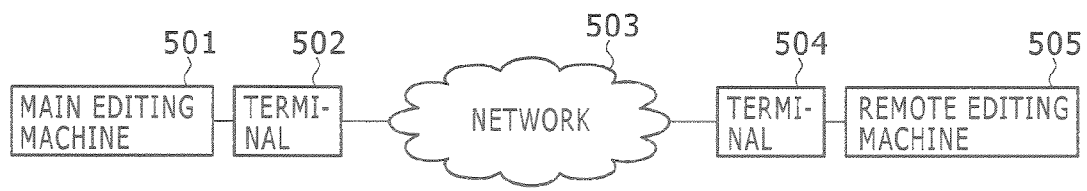
FIG. 36 shows a typical configuration of a conventional remote editing system.

The remote editing system 1 can be expanded to include a third editing machine. FIG. 35 shows a configuration of the system that includes the third editing machine.

The above configuration is similar to that of the embodiment described earlier in that the main editing machine transmits hierarchically encoded data to the remote editing machine 3 and allows the remote editing machine 3 to create the editing information. In the above configuration, however, the main editing machine 2 transmits the raw image data to the third editing machine 2a and the remote editing machine 3 transmits the editing information to the third editing machine 2a.

The third editing machine 2a then uses the editing information to generate edited image data from the raw image data.

When the remote editing system is configured as described above, a combination of the remote editing machine 3 and the third editing machine 2a forms a remote editing apparatus.

The remote editing system 1 is mainly configured for business use. It can also be configured for personal use.

For example, a household PC (Personal Computer) having a server function is used to receive a television broadcast The PC stores received data while hierarchically encoding it, and transmits low-Image-quality hierarchically encoded data to a mobile terminal via a network.

Meanwhile, the user views the transmitted hierarchically encoded data in real time at the mobile terminal while decoding it. The user then determines edit points while viewing it. After the end of the broadcast the user transmits the editing information to the household PC.

The household PC transmits the difference-representing hierarchically encoded data to the mobile terminal by using the transmitted editing information and allows the mobile terminal to generate edited image data.

Further, the data picked up by a camera for broadcast content creation can be hierarchically encoded and locally recorded into a storage device in the camera or a recording device connected to the camera while at the same time performing streaming to the main editing machine 2. In this instance, the remote editing machine 3 performs an editing operation, and broadcast content is created as the final image content for the remote editing machine 3 in accordance with the editing result.

The remote editing system 1 specifies the hierarchical levels of the image quality and resolution, which are editing information entries referenced at the time of edited image data creation and hierarchical elements having a hierarchical structure, and generates editing information by using the specified hierarchical levels. However, an alternative is to allow the remote editing system 1 to numerically specify the hierarchical level for each hierarchical element, assign qualitative evaluations to the axis, or instance, by choosing between "high" and "low" resolutions and choosing between "good" and "poor" image qualities, and use such qualitative evaluations for hierarchical level selection.

As regards the resolution, an index can be displayed after converting each hierarchical element to a commonly used measure such as "640 pixels wide, 320 pixels high" or "PSNR 47 dB."

The remote editing system 1 has been described on the assumption that the remote editing machine 3 performs an editing operation by specifying the levels of the hierarchical elements. However, an alternative configuration may be employed so that the main editing machine 2 includes the similar image display section and user interface specifies the hierarchical levels for adjustment purposes, adjusts the thumbnail image quality so as to meet the editing criteria desired by the editing side, and transmits the editing result. If, for instances an editing operation is to be performed during the shooting of a drama, it is possible to automatically recognize the position of a human face through pattern matching or the like, specify such a region as an ROI, make the image quality of the ROI higher than that of the other region, and transmit the editing result to a remote editing machine.

The present embodiment provides an editing system that generates an editing thumbnail from image data hierarchically encoded by a method such as MPEG4 FGS or JPEG2000 and transmits the generated thumbnail for use in editing. Consequently, the editing information is used so that high-quality image content is generated on the remote editing machine side.

As a result, the following configurations can be provided.

(1) A remote editing system that includes a main editing machine and a remote editing machine. The main editing machine includes means for storing data that is encoded by hierarchical encoding means; means for packetizing the stored hierarchically encoded data on an individual hierarchical level basis; means for generating network packets in relation to a hierarchized packet network; and packet communication means for transmitting the network packets. The remote editing machine includes packet communication means for receiving network packets; means for depacketizing the received network packets and incorporating them into data; means for decoding the data; and data editing means for referencing the decoded data and editing the data. The remote editing system causes the data editing means to generate editing information about the data, and transmits the generated editing information to the main editing machine. Further, the main editing machine includes means for receiving the editing information transmitted from the remote editing machine; means for referencing the received editing information; means for mapping instructions contained in the editing information to a hierarchical configuration element level of hierarchically encoded data in compliance with the instructions; and means for reading hierarchically encoded data of the main editing machine until a desired level is reached. The main editing machine transmits the read hierarchically encoded data to the remote editing machine via the encoding means, packetization means, and transmission means. The remote editing machine depacketizes the transmitted hierarchically encoded data and records the depacketized data in a final image content recording device to create final image content in the remote editing machine.

(2) The remote editing system that transfers the content generated by the final image content storage means in accordance with the FTP (File Transfer Protocol).

(3) The remote editing system in which the main editing machine includes means for specifying a picture quality selection operation for the final image content.

(4) The remote editing system in which the remote editing machine includes means for specifying the picture quality of the final image content.

(5) The remote editing system in which the main editing machine includes means for specifying the picture quality of the final image content.

(6) The remote editing system that uses the MPEG4 hierarchization technology to achieve specified picture quality.

(7) The remote editing system that uses the JPEG 2000 hierarchization technology to achieve specified picture quality.

(8) The remote editing system in which the main editing machine includes a display device for displaying decoded data.

The use of the above configurations makes it possible to construct a remote editing system in which image data is hierarchically encoded through a wavelet transform and transmitted to a remote editing machines, which is connected to a communication network, and the remote editing machine edits image content by using the transmitted image data. Transmitted editing image is adjusted for picture quality that is appropriate for an employed network band Hierarchical encoding is such that resolution or image quality transcoding which imposes a heavy load, is not necessary even when a different receiving end terminal capacity is encountered or the network communication status varies. Further, high image quality can be achieved by adding difference data. The transmitted image is used to perform edits to create editing information that contains, for instance, an edit point time code and is to be referenced at the time of final image content generation.

INDUSTRIAL APPLICABILITY

The present invention makes it possible to flexibly perform remote editing in accordance with the capacity of a remote editing apparatus an editor's request, or the network status and without performing a heavy-load information process.

The invention claimed is:

1. A remote editing system comprising:
a main editing apparatus configured to
transmit, to a remote editing apparatus via a network, first hierarchically encoded data that forms image, the first hierarchically encoded data belonging to a first predetermined hierarchical level,
receive, from the remote editing apparatus, an additional request for a second hierarchically encoded data, the second hierarchically encoded data corresponding to the first hierarchically encoded data and belonging to a second predetermined hierarchical level,
detect a difference between the first hierarchically encoded data already transmitted to the remote editing apparatus and the second hierarchically encoded data indicated by the additional request, and
transmit, to the remote editing apparatus, the difference between the first and second hierarchically encoded data; and
the remote editing apparatus configured to
accept an editing operation using the first hierarchically encoded data transmitted by the main editing apparatus to edit content of the first hierarchically encoded data,
generate the additional request for the second hierarchically encoded data,
request the main editing apparatus to transmit the second hierarchically encoded data,
generate edited image data using the second hierarchically encoded data transmitted by the main editing apparatus in compliance with the request, and
transmit, to the main editing apparatus, time codes corresponding to edit points of a plurality of content of the edited image data.

2. A main editing apparatus comprising:
data storage means for storing hierarchically encoded data that forms an image;
data transmission means for transmitting to a remote editing apparatus first hierarchically encoded data stored in the data storage means of the main editing apparatus, the first hierarchically encoded data belonging to a first predetermined hierarchical level for editing of content of the first hierarchically encoded data;
request data reception means for receiving from the remote editing apparatus a transmission request for a second hierarchically encoded data for edited image data generation in the remote editing apparatus, the second hierarchically encoded data corresponding to the first hierarchically encoded data and belonging to a second predetermined hierarchical level;
detection means for detecting a difference between the first hierarchically encoded data already transmitted to the remote editing apparatus and the second hierarchically encoded data indicated by the transmission request;
request data transmission means for transmitting the difference between the first and second hierarchically encoded data to the remote editing apparatus; and
editing control means for receiving, from the remote editing apparatus, time codes corresponding to edit points of a plurality of content of edited image data, and generating a time code list that includes the time codes.

3. The main editing apparatus according to claim 2, wherein
the transmission request that is received by the request data reception means specifies the hierarchical levels of one or more hierarchical elements defining a picture quality of an image, and
the request data transmission means transmits hierarchically encoded data corresponding to a difference between the hierarchically encoded data stored in the data storage means that corresponds to the hierarchical levels of the hierarchical elements specified by the request data reception means and the first hierarchically encoded data already transmitted to the remote editing apparatus.

4. The main editing apparatus according to claim 2, wherein the first predetermined hierarchical level is based on the remote editing apparatus.

5. The main editing apparatus according to claim 2, wherein the remote editing apparatus includes a hierarchical level configuration transmission means that transmits a hierarchical level configuration of the hierarchically encoded data stored in the data storage means of the main editing apparatus and a hierarchical level configuration of the first hierarchically encoded data transmitted by the data transmitting means.

6. A remote editing apparatus comprising:
data reception means for receiving first hierarchically encoded data for image formation from a main editing apparatus, the first hierarchically encoded data belonging to a first predetermined hierarchical level;

reproducing means for reproducing an image based on the first hierarchically encoded data from the main editing apparatus;

editing means for accepting an editing operation to edit content of the first hierarchically encoded data by using the image reproduced by the reproducing means and to generate an additional request for a second hierarchically encoded data, the second hierarchically encoded data corresponding to the first hierarchically encoded data and belonging to a second predetermined hierarchical level;

data request means for requesting the main editing apparatus to transmit the second hierarchically encoded data for the generation of edited image data due to editing by the editing means, wherein the data reception means receives a difference between the second hierarchically encoded data indicated by the additional request and the first hierarchically encoded data already transmitted by the main editing apparatus, the difference being transmitted by the main editing apparatus in response to the additional request; and edited image data generation means for receiving the difference between the first and second hierarchically encoded data transmitted by the main editing apparatus in compliance with the request, generating edited image data by using the second hierarchically encoded data, and transmitting, to the main editing apparatus, time codes corresponding to edit points of a plurality of content of the edited image data.

7. The remote editing apparatus according to claim 6, wherein the editing means accepts hierarchical levels specified for a plurality of hierarchical elements that define a picture quality of an edited image, and the data request means transmits the hierarchical levels of the specified hierarchical elements to the main editing apparatus.

8. The remote editing apparatus according to claim 6, further comprising:

hierarchical level selection means for accepting hierarchical level selections for hierarchical elements, wherein the reproducing means reproduces an image by using the hierarchically encoded data corresponding to the hierarchical level selections.

9. The remote editing apparatus according to claim 6, further comprising:

hierarchical level presentation means for receiving a hierarchical level configuration of hierarchically encoded data stored in the main editing apparatus and a hierarchical level configuration of the second hierarchically encoded data received from the main editing apparatus and presenting the received hierarchical level configurations.

10. The remote editing apparatus according to claim 7, further comprising:

warning display means for indicating a situation where the hierarchical level of a hierarchical element defining the picture quality of an image reproduced by the reproducing means differs from the hierarchical level of a hierarchical element defining the picture quality of the specified edited image.

11. An editing method comprising:

storing hierarchically encoded data that forms an image;

transmitting to a remote editing apparatus stored first hierarchically encoded data corresponding to a first predetermined hierarchical level for editing content of the first hierarchically encoded data;

receiving, from the remote editing apparatus, a transmission request for a second hierarchically encoded data for edited image data generation in the remote editing apparatus, the second hierarchically encoded data corresponding to the first hierarchically encoded data and belonging to a second predetermined hierarchical level;

detecting a difference between the first hierarchically encoded data already transmitted to the remote editing apparatus and the second hierarchically encoded data indicated by the transmission request;

transmitting the difference between the first and second hierarchically encoded data to the remote editing apparatus to the remote editing apparatus; and receiving, from the remote editing apparatus, time codes corresponding to edit points of a plurality of content of edited image data, and generating a time code list that includes the time codes.

12. An editing method comprising:

receiving first hierarchically encoded data for image formation from a main editing apparatus, the first hierarchically encoded data belonging to a first predetermined hierarchical level;

reproducing an image by using the received first hierarchically encoded data;

accepting an editing operation to edit content of the first hierarchically encoded data by using the reproduced image and generate an additional request for a second hierarchically encoded data, the second hierarchically encoded data corresponding to the first hierarchically encoded data and belonging to a second predetermined hierarchical level;

requesting the main editing apparatus to transmit the second hierarchically encoded data for the generation of edited image data due to editing;

receiving a difference between the second hierarchically encoded data indicated by the additional request and the first hierarchically encoded data already received from the main editing apparatus, the difference being transmitted by the main editing apparatus in compliance with the additional request;

generating edited image data by using the second hierarchically encoded data; and transmitting, to the main editing apparatus, time codes corresponding to edit points of a plurality of content of the edited image data.

13. A non-transitory computer-readable medium including an editing program that, when executed on a computer, causes the computer to perform a method comprising:

storing hierarchically encoded data that forms an image;

transmitting to a remote editing apparatus stored first hierarchically encoded data that belongs to a first predetermined hierarchical level for editing content of the first hierarchically encoded data;

receiving, from the remote editing apparatus, a transmission request for a second hierarchically encoded data for edited image data generation in the remote editing apparatus, the second hierarchically encoded data corresponding to the first hierarchically encoded data and belonging to a second predetermined hierarchical level;

detecting a difference between the first hierarchically encoded data already transmitted to the remote editing apparatus and the second hierarchically encoded data indicated by the transmission request;

transmitting the difference between the first and second hierarchically encoded data to the remote editing apparatus; and receiving, from the remote editing apparatus, time codes corresponding to edit points of a plurality of content of edited image data, and generating a time code list that includes the time codes.

14. A non-transitory computer-readable medium including an editing program that, when executed on a computer, causes the computer to perform a method comprising:
receiving first hierarchically encoded data for image formation from a main editing apparatus, the first hierarchically encoded data belonging to a first predetermined hierarchical level;
reproducing an image by using the received first hierarchically encoded data;
accepting an editing operation to edit content of the first hierarchically encoded data by using the reproduced image and generate an additional request for a second hierarchically encoded data, the second hierarchically encoded data corresponding to the first hierarchically encoded data and belonging to a second predetermined hierarchical level;
requesting the main editing apparatus to transmit the second hierarchically encoded data for the generation of edited image data due to editing;
receiving a difference between the second hierarchically encoded data indicated by the additional request and the first hierarchically encoded data already received from the main editing apparatus, the difference being transmitted by the main editing apparatus in compliance with the additional request;
generating edited image data by using the second hierarchically encoded data; and
transmitting, to the main editing apparatus, time codes corresponding to edit points of a plurality of content of the edited image data.

15. A main editing apparatus comprising:
a data storage unit configured to store hierarchically encoded data that forms an image;
a data transmission unit configured to transmit to a remote editing apparatus first hierarchically encoded data stored in the data storage unit of the main editing apparatus, the first hierarchically encoded data belonging to a first predetermined hierarchical level for editing of content of the first hierarchically encoded data;
a request data reception unit configured to receive from the remote editing apparatus a transmission request for a second hierarchically encoded data for edited image data generation in the remote editing apparatus, the second hierarchically encoded data corresponding to the first hierarchically encoded data and belonging to a second predetermined hierarchical level;
a detection unit configured to detect a difference between the first hierarchically encoded data already transmitted to the remote editing apparatus and the second hierarchically encoded data indicated by the transmission request;
a request data transmission unit configured to transmit the difference between the first and second hierarchically encoded data to the remote editing apparatus; and
an editing control unit configured to receive, from the remote editing apparatus, time codes corresponding to edit points of a plurality of content of edited image data, and to generate a time code list that includes the time codes.

16. A remote editing apparatus comprising:
a data reception unit configured to receive first hierarchically encoded data for image formation from a main editing apparatus, the first hierarchically encoded data belonging to a first predetermined hierarchical level;
a reproducing unit configured to reproduce an image based on the first hierarchically encoded data from the main editing apparatus;
an editing unit configured to accept an editing operation to edit content of the first hierarchically encoded data by using the image reproduced by the reproducing unit and to generate an additional request for a second hierarchically encoded data, the second hierarchically encoded data corresponding to the first hierarchically encoded data and belonging to a second predetermined hierarchical level;
a data request unit configured to request the main editing apparatus to transmit the second hierarchically encoded data for the generation of edited image data due to editing by the editing unit, wherein the data reception unit is configured to receive a difference between the second hierarchically encoded data indicated by the additional request and the first hierarchically encoded data already received by the data reception unit, the difference being transmitted by the main editing apparatus in response to the additional request; and
an edited image data generation unit configured to receive the difference between the first and second hierarchically encoded data transmitted by the main editing apparatus in compliance with the additional request, generate edited image data by using the second hierarchically encoded data, and transmit, to the main editing apparatus, time codes corresponding to edit points of a plurality of content of the edited image data.

17. A remote editing system comprising:
a main editing apparatus configured to
transmit, to a remote editing apparatus via a network, first hierarchically encoded data that forms an image, the first hierarchically encoded data belonging to a first predetermined hierarchical level; and
the remote editing apparatus configured to
accept an editing operation using the first hierarchically encoded data transmitted by the main editing apparatus to edit content of the first hierarchically encoded data,
generate editing information indicating second hierarchically encoded data,
generate difference information indicating a difference between the second hierarchically encoded data indicated by the editing information and the first hierarchically encoded data transmitted by the main editing apparatus,
transmit the difference information to the main editing apparatus,
generate edited image data using the second hierarchically encoded data transmitted by the main editing apparatus in response to receiving the difference information, and
transmit, to the main editing apparatus, time codes corresponding to edit points of a plurality of content of the edited image data.

18. A remote editing apparatus comprising:
a data reception unit configured to receive first hierarchically encoded data for image formation from a main editing apparatus;
a reproducing unit configured to reproduce an image based on the first hierarchically encoded data from the main editing apparatus;
an editing unit configured to accept an editing operation to edit content of the first hierarchically encoded data by using the image reproduced by the reproducing unit, generate editing information indicating second hierarchically encoded data, and generate difference information based on a difference between the first hierarchically encoded data received by the data reception unit and the second hierarchically encoded data indicated by the editing information;

a data transmitting unit configured to transmit the difference information to the main editing apparatus; and an edited image data generation unit configured to generate edited image data by using the second hierarchically encoded data transmitted by the main editing apparatus in response to receiving the difference information, and transmit, to the main editing apparatus, time codes corresponding to edit points of a plurality of content of the edited image data.

* * * * *